United States Patent [19]
Nishiuchi et al.

[11] Patent Number: 5,493,561
[45] Date of Patent: Feb. 20, 1996

[54] OPTICAL INFORMATION RECORDING MEDIUM AND INFORMATION RECORDING AND REPRODUCING METHOD THEREOF

[75] Inventors: Kenichi Nishiuchi, Moriguchi; Nobuo Akahira, Yawata; Noboru Yamada; Eiji Ohno, both of Hirakata; Ken'ichi Nagata, Nishinomiya, all of Japan

[73] Assignee: Matsushita Electric Industrial Co., Ltd., Osaka, Japan

[21] Appl. No.: 77,373

[22] Filed: Jun. 17, 1993

[30] Foreign Application Priority Data

Jun. 17, 1992 [JP] Japan .................................. 4-157729
Sep. 25, 1992 [JP] Japan .................................. 4-256071

[51] Int. Cl.$^6$ .................................................. B32B 3/00
[52] U.S. Cl. .................................. 369/275.1; 369/275.4
[58] Field of Search ........................... 369/275.1–275.4, 369/272, 274, 284, 283; 360/114

[56] References Cited

U.S. PATENT DOCUMENTS 4,674,081 6/1987 Gerard et al. ........................ 369/275.4
5,199,022 3/1993 Suzuki et al. ........................... 360/114
5,213,859 5/1993 Aoi et al. ............................. 369/275.1
5,249,175 9/1993 Akahira et al. ....................... 369/275.4

FOREIGN PATENT DOCUMENTS 3-157830 5/1991 Japan .

*Primary Examiner*—Davis L. Willis
*Assistant Examiner*—Don Wong
*Attorney, Agent, or Firm*—Wenderoth, Lind & Ponack

[57] ABSTRACT

An optical information recording medium, wherein concave and convex shaped guide grooves narrower in width W than the spot diameter of the laser beam is formed in the face of the recording film layer of a substrate, and the recording film layer undergoes optically detectable changes caused by the application of a laser beam thereto, the detectable changes being due to the changes in the optical phase of the reflected light or the transmitted light, and the changes in the optical phase being caused in the direction of reducing the optical phase difference between concave and convex portions of guide grooves disposed in the substrate.

18 Claims, 17 Drawing Sheets

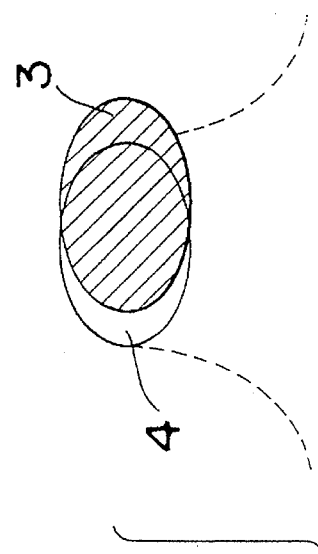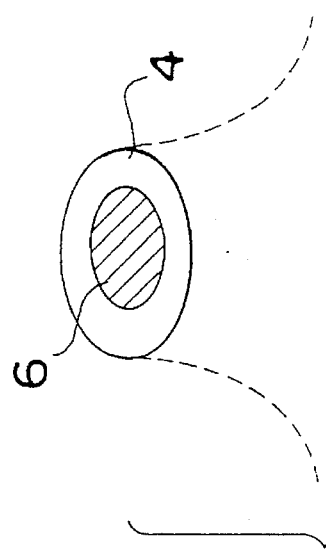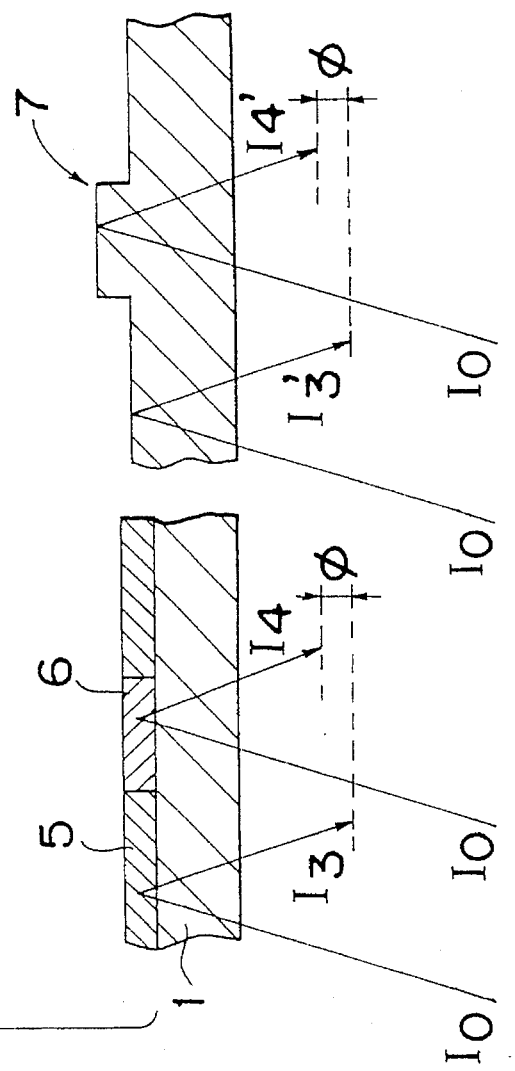

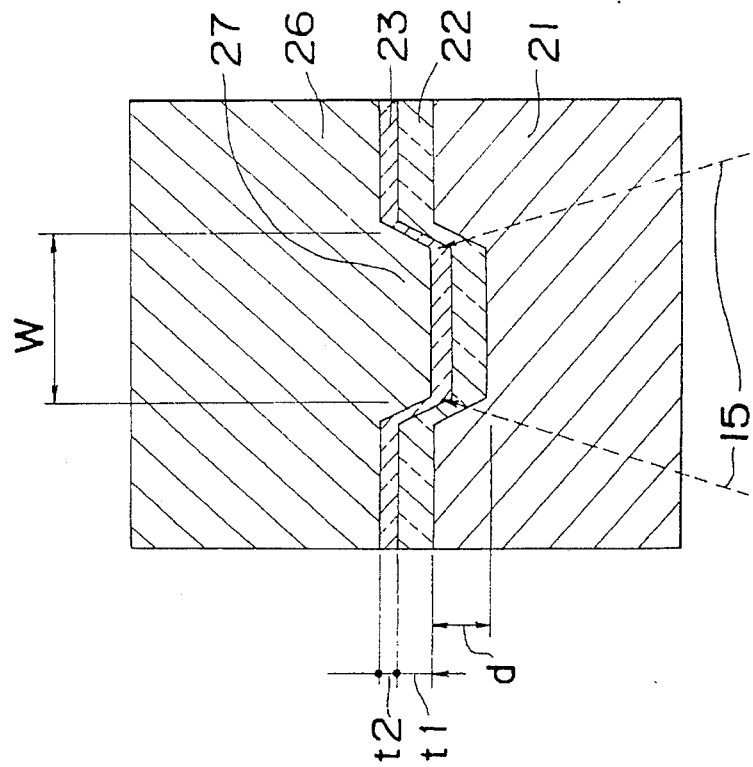
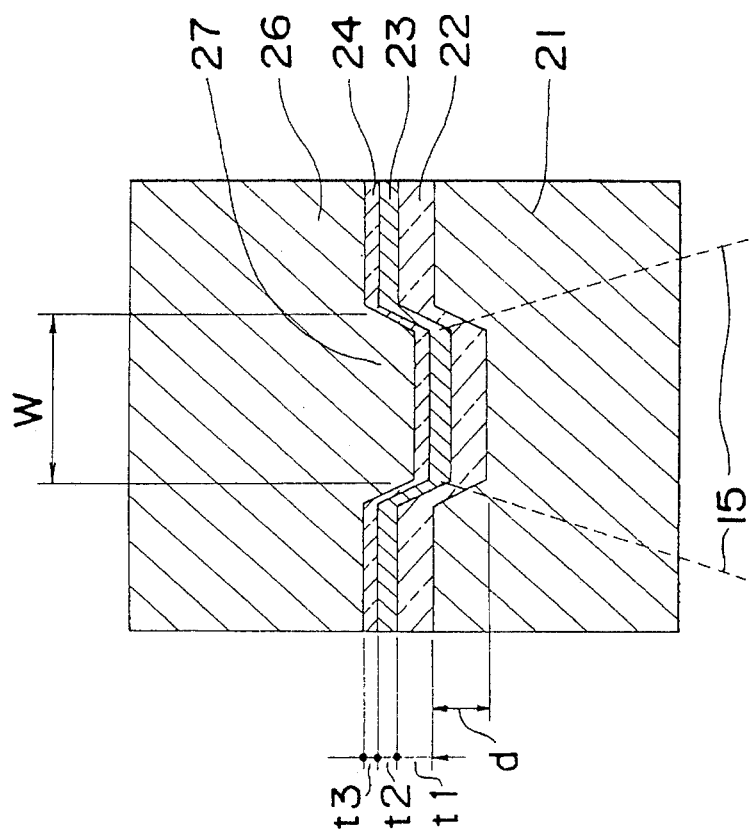
Fig. 4(a)
Fig. 4(b)

laser beam

Fig. 11
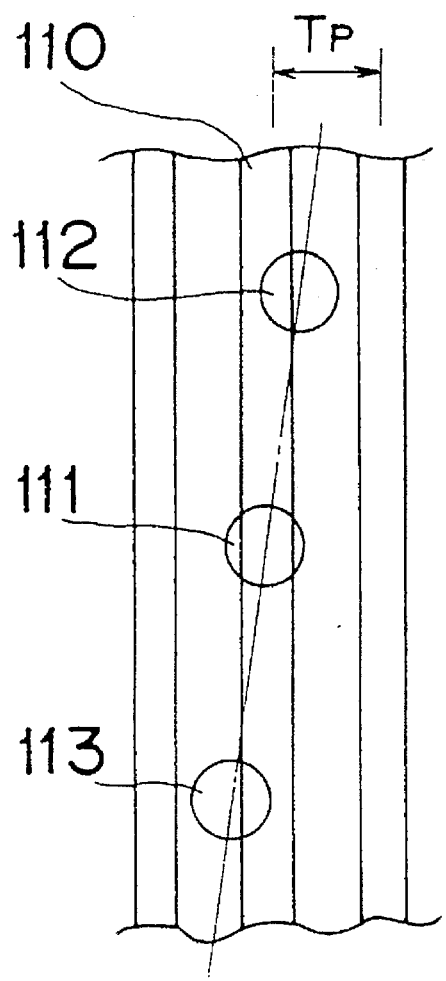
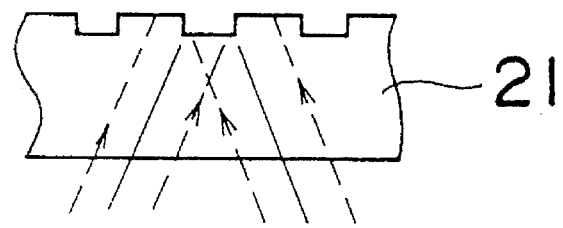

OPTICAL INFORMATION RECORDING MEDIUM AND INFORMATION RECORDING AND REPRODUCING METHOD THEREOF

BACKGROUND OF THE INVENTION

The present invention generally relates to an optical information recording medium, and a recording and reproducing method for recording and reproducing information with high speed and high density.

When a laser beam is focused by a lens system, the diameter of optical spots can be made smaller, on the order of the wavelength of the light. Therefore, light spots having a high energy density per unit area can be made even from a low level light source. Minute regions of a material can be changed by such light spots, and the changes in the minute regions can be read out. An optical information recording medium uses such changes in recording and reproducing operations. The optical information recording medium is hereinafter referred to as "an optical recording medium" or simply "a medium".

A recording film layer is provided, in the basic construction of the optical recording medium, on the substrate whose surfaces are flat. The recording film layer changes in some condition by the application of laser light spots. The signal recording and reproducing operations on the medium are effected by the method described hereinafter. The recording medium is moved by a rotating means and a translating means such as a motor so as to apply focused laser beams onto the recording film face of the medium. The recording film absorbs the laser beams so as to raise its temperature. When the output of the laser beams is at least a threshold value, the condition of the recording film is varied so as to record the information. The threshold value is a quantity depending upon the thermal characteristics of the substrate, in addition to the characteristics of the recording film itself, and the relative speed of the medium with respect to the optical spots. Laser beam spots of an output sufficiently lower than the threshold value are applied to the recording portion of the medium and the differences of some optical characteristics in one of the transmission light intensity, the reflection light intensity, the polarization directions or the like between the recording portion and the non-recording portion are detected for reproducing the recorded information.

A metallic film with Bi or Te as principal components, or a compound film including Te are known recording films. They are shape change types of recording mediums using the steps of melting or evaporating the films with a laser beam, and forming small holes. The signal reproduction from the recorded portion is effected by the detection of the difference between the amount of light reflected or the amount of light transmitted between a small hole portion and the peripheral portion thereof.

A state change type of recording film has optical changes without being accompanied by the shape changes. The state change type recording film changes its state condition by the application of a laser beam, and changes its complex refractive index during the time. Generally the refractive index n and the extinction coefficient k of the complex refractive index change in the same direction. Most materials considered as optical recording mediums increase the complex refractive index when the state condition changes to a crystalline state from an amorphous state. A weak light is applied to the signal pattern formed as the difference of the phase condition and the amount light transmitted or reflected from the medium is measured so as to effect the signal reproducing operation from the recording film.

Light is described by amplitude and optical phase. The information from the recording medium is effected by the detection of changes in the amount of light transmitted or reflected to a photodetector of the reproduction optical system. There is a case (amplitude change record) where a transmission beam amplitude or a reflection light amplitude in the minute region of the optical film itself changes, and a case (optical phase change record) where the phase of the transmitted light or the reflected light changes. Reproduction signals are obtained by the change in the complex refractive index by the state change being provided as the composition of the changes of both the amplitude change and the state change.

The phase change optical disk records signals by the formation of the difference (recording mark) of the local state condition on the recording film, by the application of a laser beam modulated in intensity on the rotating recording medium, and reproduces the signals with the detection, as a reflection difference, of the difference caused between the conditions. The size of the recording mark to be obtained becomes a size of the focusing optical spot, namely, on the order of a wavelength. Assume that a laser beam of approximately 780 nm in wavelength is focused using a lens system of approximately 0. 5 in N.A. (numerical aperture), and the full width half maximum in intensity is focused to spot of approximately 0.9 µm. The intensity of the optical spot is generally of a Gausian distribution or a distribution of a shape which is closer to it. When a recording operation is effected using the optical spot, the state condition become a recording condition with the range of approximately 5 through 1 µm being changed.

FIGS. 1(a)–1(c) show the relationship between the recording mark and the optical spot for obtaining the maximum signal change. In FIG. 1(a) the state change recording film is adapted to show the amplitude change record, and in FIG. 1(b) it is adapted to show the optical phase change record. In the construction showing the amplitude change records FIG. 1(a), the amplitude change recording mark 3 formed on the recording film 2 on the substrate 1 changes mainly in reflection index. In the scanning operation on the mark 3 by the optical spot 4 formed by a weak light beam $I_0$ for reproduction, the amount of light change on the photodetector to be obtained by the reproduction optical system, that is, the conditions for making the signal amplitude maximum, namely, the conditions for making maximum the difference between the reflection light $l_2$ of the recording mark portion and the reflection light $l_1$ of the non-recording condition are to make the size of the recording mark 3 changed state condition is equal to or greater than the reproduction spot 4 size.

As in FIG. 1(b), even in the case of the optical phase change recording operation, the change of the recording film 2 itself is the same as the amplitude change, and the recording mark 6 is formed by the similar beam application. In the recording mark showing the ideal optical phase change record, the reflected light $I_4$ of the same intensity as that of the reflected light $I_3$ of the non-recording condition is reflected with respect to the incident light quantity $I_0$ and changes by $\phi$ in the optical phase of the light. The recording condition by the optical phase change forms concave or convex pits 7 on a plane portion as shown in FIG. 1(c) with respect to the optical spot, and functions as when the optical phase has changed by the concave or convex stage difference. The conditions showing the maximum signal amplitude by the optical phase change records become conditions where the diffraction effect of the light by the optical phase difference by the optical phase change record is conditions where the diffraction effect of the light by the optical phase difference when the reproduction spot 4 has scanned the recording mark becomes maximum. When the optical intensity of the region incident to the recording mark 6 becomes equal to the amount of light incident on the peripheral portions of the optical spots 4, the effect of the interference becomes largest and the amount of light into the photodetector becomes minimum. The amount of reflected light becomes minimum under the cancelling conditions with interference between the reflected light $I_4$ from the recording mark and the reflected light $I_3$ from the non-recording portion, so that the maximum signal amplitude of the optical phase change record is obtained.

When the two recording modes are compared with the recording marks showing the maximum amplitude, it has been found that the recording and reproducing operation of high density in the optical phase change recording can be effected, because the optical phase change recording mark 6 can be recorded in a smaller shape than the amplitude change recording mark 3. It is possible to provide a recording medium which is interchangeable with an optical disk for reproduction only use where concave and convex pits like a compact disk or the like are used for recording information if the optical phase change recording can be realized.

As the state change medium showing the optical phase change recording is a recording method using a heat mode using the heat of the light, the application of the light to the recording film is accompanied by a thermal diffusion phenomenon. A portion which has absorbed the optical energies rises in temperature and also, at the same time, the generated heat is diffused to a portion where the peripheral temperature is lower. The recording mark formed in the application portion is distributed in the intensity of the light to be applied, with a problem in that the size thereof changes in accordance with the amount of energy (application power) to be made. In the case of the conventional reflected light change, the mark shape effects a maximum signal amplitude with the mark shape being equal to the spot diameter (a size which becomes $1/e^2$ in the intensity of light). A pitch of the mark to be recorded in the track direction is a value equal to a spot diameter or a lower value from a point of view of raising the recording density as much as possible. It is necessary to make the recording mark constant in range for the stability of the signal reproduction from the recording portion. It is necessary to set the energy of the light applied at the recording time, namely, the recording power within a constant range. When the change in the mark shape is large with respect to the recording power, the power range becomes small. It becomes very difficult to design a recording apparatus including the variation and dispersion and so on of the recording laser light. The optical phase change record is suitable for the high density recording, because the mark shape is relatively small as compared with that of the amplitude change recording method. In order to make small recording marks, it is more difficult to retain within a constant tolerance range the tolerant width, namely, the recording power with respect to the recording variation.

SUMMARY OF THE INVENTION

Accordingly, the present invention has been developed with a view to substantially eliminating the above discussed drawbacks inherent in the prior art and for its essential object to provide an optical information recording medium, and an information recording and recording method thereof.

Another important object of the present invention is to provide an improved recording medium for stably forming minute recording marks, and a recording method thereof.

In accomplishing these and other objects, according to one preferred embodiment of the present invention, there is provided an optical information recording medium comprising a substrate and a recording layer formed thereon; said substrate comprising a guide groove with a concave portion, and a convex portion; a width of the groove being made smaller than a spot diameter of a light beam focused on the recording layer; the recording layer undergoing optically detectable changes by an application of the light beam which is modulated according to an information signal; the optically detectable changes of the recording layer caused by the light beam being a state change of the layer from a first state into a second state before an application of the light beam of a first intensity; and changed into the first state from the second state before the application of the light beam of a second intensity which is lower than the first intensity; the first state and the second state having different complex refractive indices; an optical phase of a reflected light beam from the recording layer being different between a region of the first state and a region of the second state; a change of the optical phase from the first state to the second state reducing an optical phase difference between the concave portion and the convex portion of the guide groove.

The recording operation can be effected with the shape in the width direction of the recording mark with respect to the variation of the recording power being in a constant range, because the edges of the guide grooves restrain the diffusion in the film face direction of heat caused by the laser beam application by the formation of the recording film layer showing the optical phase change on the substrate provided with the guide grooves. The signal amplitude equal to a case of recording on the plane portion can be obtained by the recording operation having the optical phase changes equal and opposite to the optical difference by the depth of the guide groove by the application of a laser beam.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 1(a)–1(c) are views of signal reproduction of amplitude change records and optical phase change records;

FIGS. 4(a)–4(b) are views in accordance with second and third construction embodiments of an optical information recording medium;

FIG. 11 is an arrangement view of optical spots on an optical recording medium in the embodiment;

DETAILED DESCRIPTION OF THE INVENTION

Figure 2A:
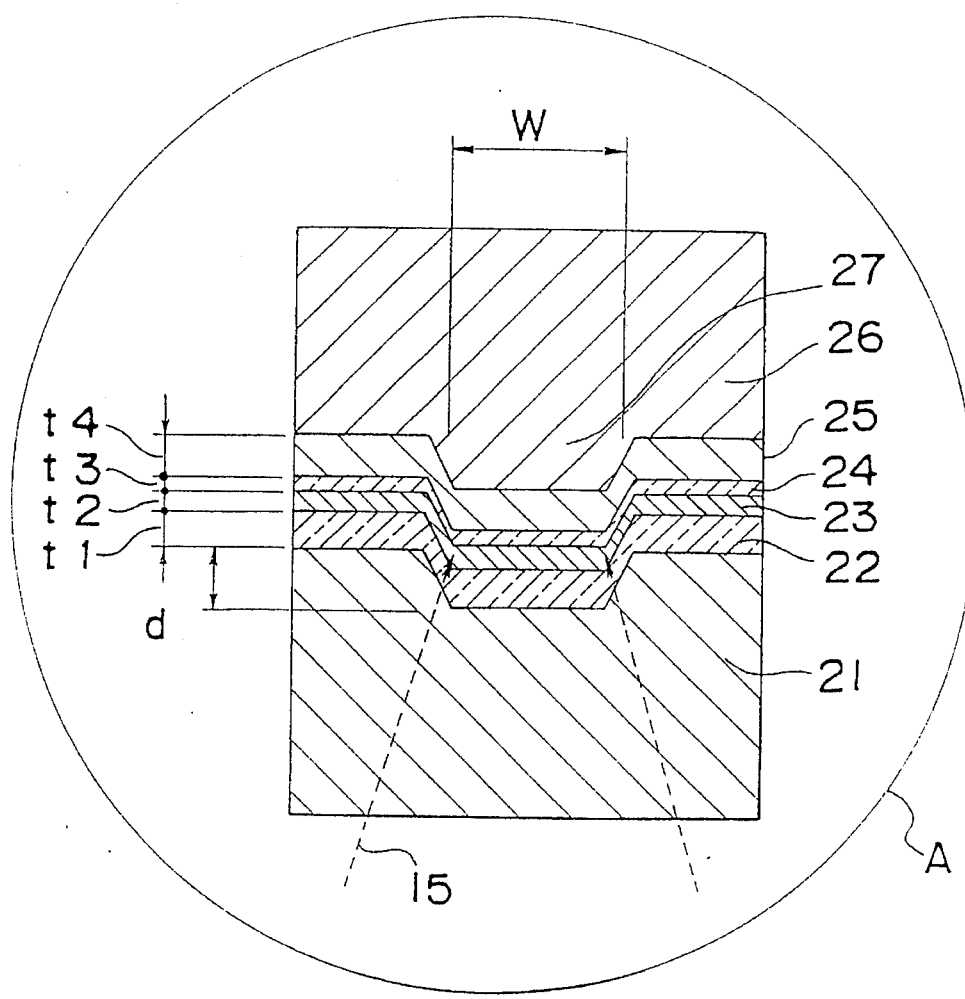
FIG. 2 is a sectional view showing the construction of the optical recording medium of an optical information recording apparatus.

Before the description of the present invention proceeds, it is to be noted that like parts are designated by like reference numerals throughout the accompanying drawings.

An optical recording medium in accordance with one embodiment of the present invention and a recording method thereof are described hereinafter with reference to the drawings.

Figure 2B:
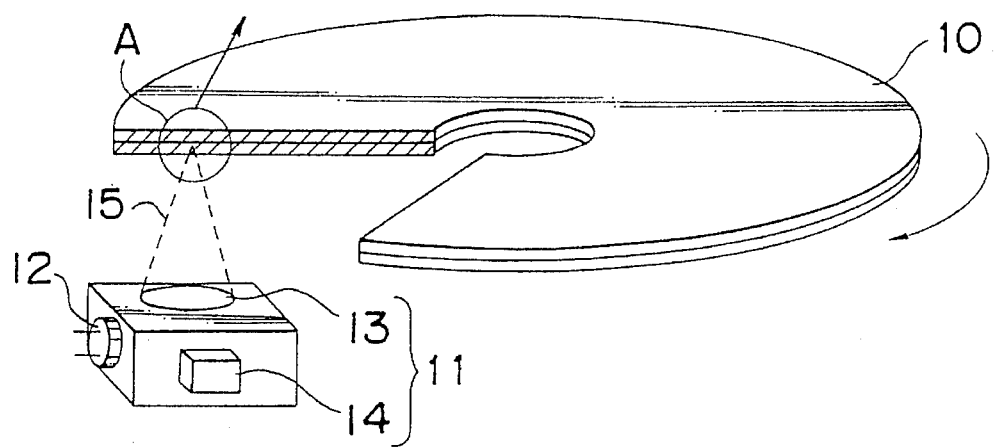

An embodiment of a recording medium showing the optical phase change is described below. FIG. 2 is a sectional view of the construction of the recording medium and the film construction. Light beams are focused on the recording film layer on an optical disk by an optical system 11 while an optical disk 10 which is one of the optical recording media is being rotated by a rotary means such as a motor. The optical system is composed of a light beam source 12 such as semiconductor laser, an objective lens 13 for focusing the light beams, and a photodetector 14 for detecting the light beams reflected from the optical disk. A controlling operation of following a specific track on an optical disk by the light beams 15 and a reproducing operation of a signal recorded on the optical disk are effected in accordance with signals from the photodetector 14.

The construction of the optical disk of a portion irradiated by the light beams is shown in an upper view. A transparent layer 22, a recording layer 23, a transparent layer 24, and a reflection layer 25 such as optically transparent dielectric are provided on a substrate 21. A protective layer 26 may be removed. Air (refractive index 1.0) can be used instead of the protective layer. A material different in refractive index from the substrate 21 is used for the transparent layer 22.

A medium having a larger optical phase change can be obtained with the thickness t2 of the recording layer, the thicknesses t1 and t3 of the transparent layer, and the thickness t4 of the reflection layer being made a specific value. A film construction showing the optical phase change, a layer construction with a recording layer 23, transparent layers 22 and 24, and a reflection layer 25 being integrated therewith are described as a recording film layer.

A transparent, smooth plate of glass or resin is used as a substrate 21. The shape of the substrate is different in accordance with the use. If it is an optical disk, it becomes a circular plate. If it is an optical card, it becomes a square plate. If it is an optical tape, it becomes tape shaped. A guide groove 27 which uses the optical characteristic of the optical phase change record (described later in detail) and is concave or convex shaped for retaining the recording mark shape is shaped on the substrate surface. A molten resin in solvent is applied and dried, and a resin plate bonded with a bonding agent or the like is used as a protective layer 26.

A chalcogenide, a material for causing state change between an amorphous state and a crystalline state, such as a SbTe system, an InTe system, a GeTeSn system, an SbSe system, a TeSeSb system, an SnTeSe system, an InSe system, a TeGeSnO system, a TeGeSnAu system, a TeGeSnSb system or the like is used as a recording layer 23. An oxide system material such as a Te-TeO2 system, a Te-TeO2-Au system, a Te-TeO2-Pd system or the like can also be used. A metallic compound of an AgZn system, an InSb system or the like which effects a state condition between one crystalline state and another crystalline state can also be used. These materials can be combined, or the composition can be selected in accordance with the use of the recording medium as an object when the state condition is in one direction only, when the reversible change of many times is needed or the like.

Oxides such as SiO2, SiO, TiO2, MgO, GeO2 or the like, nitrides such as Si3N4, BN, AlN or the like, sulfides such as ZnS, PbS or the like can be used as the optically transparent layer 24. A metallic material such as Au, Al, Cu or the like, or a dielectric multilayer film having a large reflection index at a given wavelength or the like is used as a reflection layer.

The film thickness of each recording film layer can be obtained by optical calculation. The complex refractive index of each layer, the reflection index with respect to the film thickness and the optical phase of the reflection light are reflected by a matrix method (For example, see a third chapter in 1971, IWANAMI SHOTEN "Surge Optics" written by Hiroshi IWATA.) The substrate 21 and the tight protective layer 26 are obtained as one having a film thickness of infinity (the effects of the substrate—air boundary, and the tight protective layer —air boundary are neglected), the reflection index is obtained as a ratio to be projected into the substrate of the light incident from the substrate, the optical phase in the boundary of the substrate 21 and the transparent layer 22 is obtained as a reference. The optical phase is equivalent to the period of 2 π.

In the optical calculation, the wavelength of the light to be applied is assumed to be 780 nm, and the optical constant of each layer with respect to the wavelength is defined. Each film layer is formed by a sputtering method with respective materials on a glass substrate. The thickness of the film obtained at first is measured. The transmission index and the reflection index are measured by a spectro-luminous intensity system so as to calculate the optical constant in accordance with these values. The optical constant of a state (amorphous condition), as is, formed with the sputtering operation is measured using a ternary compound of germanium, antimony, and tellurium having the composition of Ge2Sb2Te5 which is a phase change material used as a recording layer 23. The complex refractive index (n+ki) is (4.5+1.3i). It becomes (5.5+3.4i) in a crystalline state where it is thermally processed for five minutes at 300° C. The Ge2Sb2Te5 has a phase change between an amorphous state and a crystalline state. The state is a reversible change with the application of a laser beam. A polycarbonate region (PC) is used in the substrate 1. Zinc sulfide (ZnS) is used as transparent layers 2 and 4. Gold (Au) is used as the reflection layer 25. The complex refractive indexes are respectively (1.58 +0i), (2.10+0i), (0.18+4.64i).

An optical calculation with the film thickness of each layer being changed is effected. The optimum film thickness conditions are decided from the following three points so that the optical phase change is effectively worked as the optical recording medium forms the result.

1) Proximity to the conditions where the optical phase difference of the reflection light from the amorphous state (recording portion) of the recording layer and the crystalline state (non-recording portion: peripheral portion except for the amorphous state) becomes maximum, namely the optical phase difference $=(1\pm 2s)\pi$. (s is an integer.)

2) The reflection indexes of the recording portion and the non-recording portion are equal to each other or the reflection index of the recording portion is larger than the non-recording portion so that the amplitude change may not reduce the effect of the recording density improvement by the optical phase change among the optical changes to be caused by the state change in the recording layer.

3) The reflection index of the non-recording portion is high as much as possible from a point of view that the reliability of the servo operation in the case of the construction of the apparatus or the signal amplitude to be obtained is larger.

The calculation result with the film thickness of each layer being changed has a large optical phase change when the recording layer 23 is less than 40 nm thick. When the thickness of the recording layer 23 is 15 nm, the thickness of the dielection layer 25 is 50 nm, the film thickness of the transparent layers 22 and 24 are respectively 116 nm and 35 nm, the reflection index of the amorphous state is 6.8%, the reflection index of the crystalline state is 7.6%, the optical phase change amount is $(-0.86)\pi$. The embodiment of the present invention is described in detail below using the optical phase change recording layer of the film thickness construction.

Figures 3A, 3B:
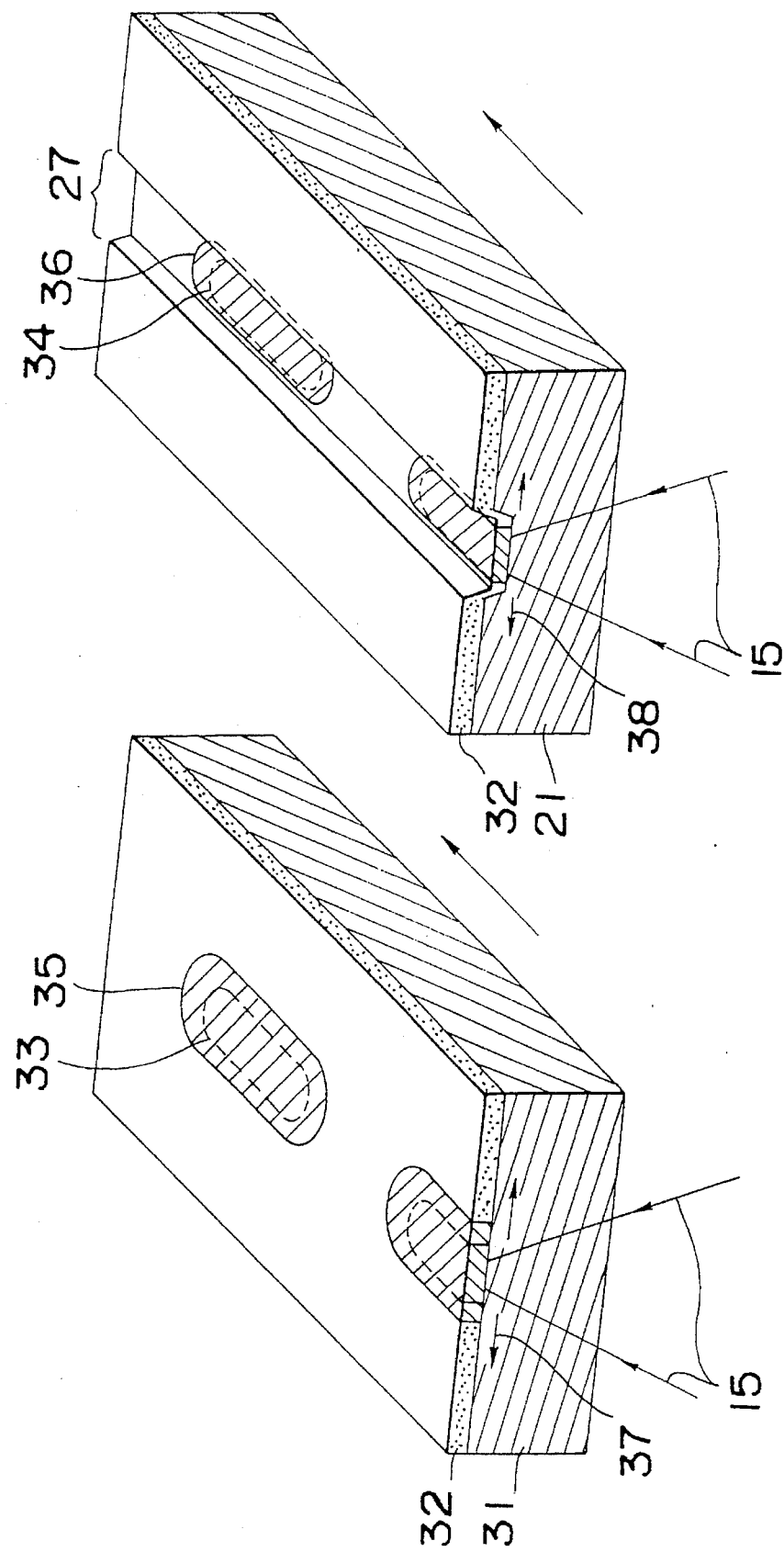
FIGS. 3(a)–3(b) are views of a mark shape limiting effect of the recording mark with guide grooves.

An optical phase change medium is formed on a substrate provided with a guide groove 27 of specific shape as a method of retaining an operation margin with respect to the power variation at the recording time as an object of the present invention. The effect of the shape restriction of the recording mark by the guide groove is described below using FIGS. 3(a)–3(b). FIG. 3(a) is an example where a recording film layer 32 is formed on a substrate 31 with the surface being a plate, FIG. 3(b) is a construction where the recording film layer 32 is provided on the substrate 21 with concave and convex guide grooves 27 being provided on the surface. The shape of the recording mark when the power of the light to be applied is low in the respective conditions is shown by dotted lines 33 and 34. The shape of the recording mark formed when the recording power is high is shown by solid lines 35 and 36. When the recording is effected on the plane portion as shown in FIG. 3(a), the recording mark is expanded in both the track direction and the vertical direction to the track and the vertical direction with the thermal diffusion 37 in the film face direction of the film when the recording power becomes higher. The change in such recording mark shape causes changes in the signal amplitude at the recording time, thus resulting in errors in the signal demodulation time. When the signal is recorded on the guide groove as shown in FIG. 3(b), when the recording power is low, the same recording mark 36 is provided as in the recording case on the plane when the power is low. When the power is high, the recording mark 38 of a shape where the expansion of the track of the recording mark and of the mark in the vertical direction is restrained plane is obtained. It means that the thermal diffusion 38 of the track and the vertical direction is small. It is considered that the substantial distance for the thermal diffusion is enlarged or the film thickness of the recording film layer of the edge portion becomes smaller, or the like by the guide grooves. By the thermal screening effect, the variation of the signal amplitude becomes small as the size (area) of the recording mark to be obtained becomes small with respect to the variation of the recording power, thus making it possible to enlarge the operation power margin seen from the optical recording apparatus.

The shape of the guide groove is required to have within a constant range the shape in accordance with the optical phase change amount of the recording film layer. The signal amplitude at the reproduction time is different in the recording on the plane and the recording onto the guide groove if the size of the recording mark is the same. When the guide grooves exist, the result where the optical phase difference caused by the stage difference between the concave and convex portions of the guide grooves are further added to the optical phase change by the recording mark. The reflection light amount when the optical spot has moved on the recording mark 36 is determined by the optical phase difference caused between the track and the concave portion of the guide groove in the vertical direction by the optical phase difference caused mainly between the concave portions of the guide grooves in the track direction component. The optical phase difference caused by the concave portion of the guide groove often functions in a direction of reducing an item of the optical phase difference having the recording film. In the present embodiment, the recording mark having the phase change is formed in a direction of offsetting the optical phase difference caused by the guide groove being concave or convex.

The recording mode of the state change recording medium to be used in the present embodiment is described in a shape of forming the mark of an amorphous state on the crystalline state (peripheral portion). The mode may be a recording mode in an opposite direction if the state change is one for optically providing the optical phase difference. The record may be one using the state change between the crystalline state and another crystalline state. The concave shape may be used on the laser light side about the groove shape of the substrate, but the convex may be oppositely provided on the laser beam side. Although the $\lambda/4n$ (n: refractive index of substrate) is described about the depth of the concave and convex grooves, the value has only to be a value showing the effect equivalent to the present invention in accordance with the construction of the servo system of the recording apparatus or the tolerance of the servo.

Although the rewriting of the optical phase change medium is not described in detail in the present embodiment, the optical phase change is obtained by the change in the film thickness construction using the state change type of recording material used in the conventional amplitude change in the present invention, and a similar effect can be effected even after the rewriting operation.

The construction of the recording film having the optical phase change can be realized if the construction is a three-layer construction with transparent layers 22 and 24 being provided on both sides of the recording layer 23 as shown in FIG. 4(a) except for a four-layer construction shown in FIG. 4(b) or the construction is a two-layer construction with a transparent layer 22 being provided between the substrate 21 and the recording layer 23 as shown in FIG. 4(b). The complex refractive index of the film is measured using a ternary alloy film of composition of Te49O23Pd28 as, for example, a recording layer 3, the amorphous state is (3.1+ 1.2i), and the crystalline state after the thermal treatment for five minutes at 300° C. The film thickness composition is obtained from the optical calculation. ZnS is used in the transparent layer 24 as in the two-layer construction. A film of composition of Te49O23Pd28 is used for a recording layer. When the film thickness is respectively made 97 nm and 20 nm respectively, the optical phase change amount becomes approximately ($-\pi/2$). The similar material is used as a three-layer construction. A transparent layer 22, the recording layer 23 and the transparent layer 24 are made 76 nm, 30 nm, and 130 nm respectively. The optical phase change amount becomes approximately ($-\pi/2$). A disk of similar optical phase change construction can be obtained even in the construction of such film as described hereinabove. A optical phase change recording can be realized even in a single layer construction with a recording layer only being formed on a substrate if a recording layer is applied which is small in an imaginary number portion of the complex refractive index, namely, the attenuation coefficient and is large in refractive index change between two states.

EMBODIMENT 1

Figure 5:
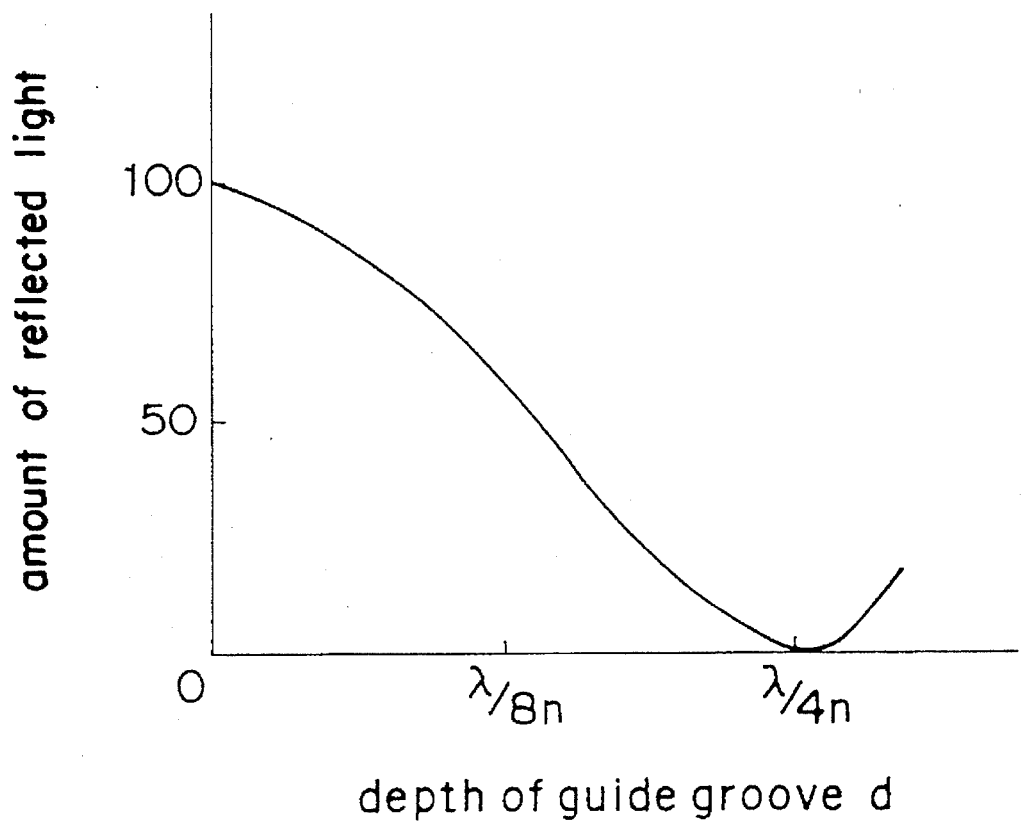
FIG. 5 is a characteristics graph showing the guide groove depth dependence of the amount of reflected light obtained from the recording medium of the non-recording condition.

The construction of the guide groove for restricting the shape of the recording mark with respect to the change in the recording power is described below. FIG. 5 shows the reflected light amount incident on a photodetector of an optical system when the groove depth d is changed with the width of the guide groove being constant. The value is shown with a relative value with the reflected light amount from the plane portion (d=0) being provided as a reference. As the groove becomes deeper, the reflected light amount is lowered, and shows a change of becoming minimum in the $\lambda/4n$. The light amount increases in the $\lambda/4n$ or more, and the optical phase of the reflection light from the groove portion becomes equal to one rotation ($\lambda=2\pi$) in the $\lambda/2n$, and becomes a reflection light amount equal to the plane. Conditions showing the change of the guide groove, namely, the maximum reflection light amount change in the optical phase change record from the drawing are a case where the plane portion and the optical phase recording mark of the $\lambda/4n$ depth are formed. The drawing shows the ideal condition assumed to be vertical in the shape of the edge portion of the guide groove. When the edge portion becomes oblique by the forming conditions of the substrate, the curve is shifted in a larger direction of the depth d, and the minimum value of the reflection light amount becomes 0 or larger.

Figure 6:
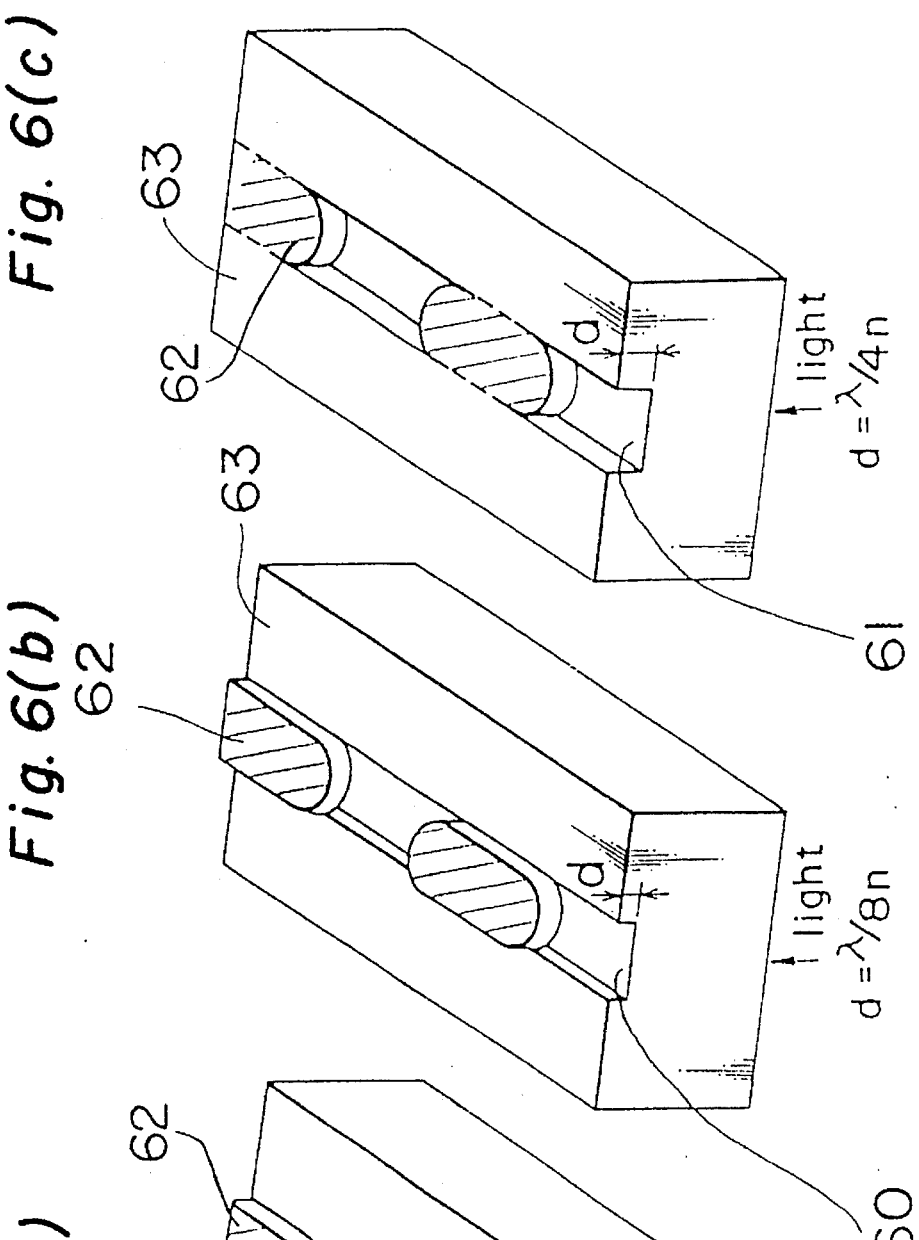
FIGS. 6(a)–6(c) are views with an optical phase change record being effected on guide grooves which are different in depth.

FIGS. 6(a)–6(c) show views when the optical phase change record is effected on a substrate with the depth d of the guide groove being changed. The recording condition of the optical phase change recording is not caused by the shape change as described hereinabove. The guide grooves of the depth of 0, $\lambda/8n$, $\lambda/4n$ are shown in the order of FIGS. 6 (a), 6(b), and 6(c). The optical phase change amount for causing the recording film is made $-\pi$ showing the maximum optical phase difference in the recording mark portion and the non-recording portion. Here it is $\lambda/n =2 \pi$. It is shown with $\lambda$ when the groove depth is shown. The description is effected with the $\pi$ being provided as reference in the case of the optical phase difference. The change in the optical phase by the recording mark caused by the recording on the plane, and the guide grooves 60 and 61 functions as in the case of the formation of the concave and convex pits with respect to the optical beams 15 incident as described in FIGS. 1(a)–1(d). In FIGS. 6(a)–6(d), for easier understanding of the optical phase relationship between the guide grooves 60 and 61 and the recording mark, the optical phase is used with imaginary mark 62 expressing the stage difference with concave and convex pits. The condition where the recording onto the state change medium, here the recording mark of the amorphous state is formed on the crystalline state, becomes a shape where concave and convex pits of $\lambda/4$ corresponding to the optical phase difference of $-\pi$ are formed on the plane or the guide grooves 61 and 62. The reflected amount of light at this time is represented by the composition of the concave and convex pits (imaginary mark) by the optical phase change in the respective construction, three components in the optical phase caused between the concave faces 60 and 61 of the guide groove, and the plane 63 in the case of FIG. 6(b). In the case of FIG. 6(c) of the $\lambda/4n$ in groove depth, the imaginary mark 62 and the plane 63 of the substrate become the same in plane as in FIG. 6(a) recorded in the plane portion, and the reflected amount of light difference caused between the non-recording portion and the recording mark becomes maximum. As a result, it is found that the optical phase change amount equivalent to the pit signal for conventional reproduction exclusive use is obtained.

When, for example, the optical phase change medium of the above described construction is formed in the substrate having guide grooves of $\lambda/4n$ in depth, the signal is recorded in the guide groove, the phase difference between the imaginary mark and the plane becomes $+0.14\pi$, because the optical phase change amount of the recording mark is $-0.86 \pi$. It follows that the recording operation is effected with the depth of the normal guide groove becoming approximately $1/7$. Sufficient level is obtained as the signal amplitude. The maximum amplitude can be obtained using the guide groove for providing an optical phase difference of ideally $0.86 \pi$, namely, the guide groove of the depth of $0.215\lambda$.

In order to use to maximum the optical phase change of the optical phase change medium as described hereinabove, it is necessary for the optical phase change amount by the recording film layer to conform to the absolute value of the optical phase difference by the guide groove and the direction of the optical phase is opposite in polarity. The equivalent effect is obtained even about the either optical phase difference, even if the absolute value is a value added to a value of an integer multiple of $\lambda$ (optical phase change amount $=2 \pi$).

Figure 7:
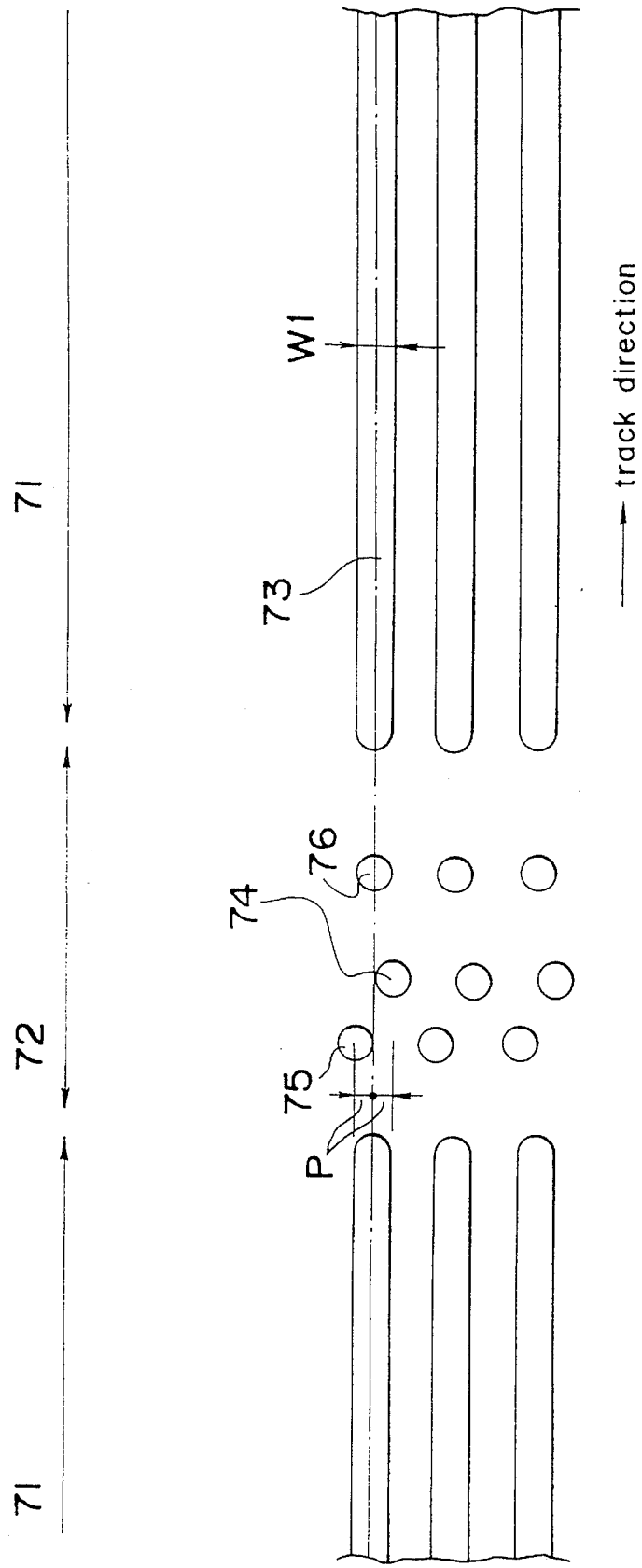
FIGS. 7(a)–7(c) are plane views showing the construction of a guide groove in accordance with a first embodiment of the present invention.

A sample servo system capable of separating the data region 71 from the servo region 72 is adopted in FIGS. 7(a)–7(c). This is a method of disposing sample pits 74 and 75 in a data region shifted by p on both sides of the central line of the recording track composed of the continuous guide groove 73, and obtaining a tracking signal in accordance with the reproduction signal from the sample pit 74. In the tracking servo operation, such a servo operation is effected as the reproduction light amount from the rear sample pits 74 and 75 which makes a pair with the front sample pit. In the continuous groove 73 of the data region, the tracking control is effected by the holding operation of the control signals from the above described sample pits. As the signal is obtained from either pit even if the depth of the pit is $\lambda/4n$ in the case of the sample pit, the stable tracking servo condition is obtained. The signal in the optical phase change effects the recording operation by the modulation of the laser beams in accordance with the timing signal from the clock pit 76. It is desirable to effect mainly a servo operation out of the region of the above described continuous groove even about the focus signal.

A method of setting the groove width W1 of the guide groove is described hereinafter. The measurement of the signal with respect to the recording power is by the gradual change in the groove width W1 of the guide groove for recording the mark. The film of the layer construction is rotated with a linear speed of 10 m/s. The semiconductor laser beam of 780 nm is focused on the recording layer with a lens of NA=0.5 in numerical aperture so as to record the signal of 6 MHz as an experiment. The power of the laser beam is made 5 mW in bias level. The power of the peak level is changed by stages. The signal amount (C/N) with respect to each power is measured. As a result, when the recording operation is effected on a plane not provided with grooves, changes with the peak power 15 mW being maximum are shown. In the range of 0.2 through 0.8 μm in groove width, a region small in variation in a range of ±1 dB or lower occurs with a C/N being in the range of ±5% in recording power variation. Especially in the range of 0.3 through 0.6 μm, the signal amplitude change is small with respect to the increase of ±10% in peak power. The power showing a constant value in a signal amplitude is shifted onto higher power side as the groove width is larger. It can be confirmed that the width of the mark is restricted in the edge of the guide groove by the observation of the recording condition of the power region where the signal amplitude change is small by a transmission electromicroscope. It means that the thermal diffusion from the center of the recording mark is prevented with the stage difference in the edge portion of the groove. The recording operation having a constant recording width can be effected with respect to the variation in the recording power using the substrate for setting the groove width from the result under the above described conditions. When the small mark is formed like the optical phase change record, the preferable recording conditions can be obtained with the optimum selection of the adiabatic conditions by the groove edge.

The groove conditions shown here are the results in a case of an optical spot determined with 780 nm in wavelength, numerical aperture =0.5. When the focus is changed by the design of the optical system, the relationship of the following equation is provided. The groove width of 0.2 through 0.8 μm, namely, the groove width W1 where change of the C/N becomes ±1dB or lower with respect to the power variation ±5% is as follows in the relationship of the following equation where the wavelength is μ, and the numerical aperture is NA.

$$0.13 \geq W1 \times NA / \lambda \geq 0.51 \qquad \text{(equation 1)}$$

When the present embodiment and the film thickness construction of each layer of the film of the recording medium or the thermal transfer index of a material to be composed is very different, it is necessary to select optimum values including the depth of the groove and the groove edge shape if necessary.

EMBODIMENT 2

Figure 8:
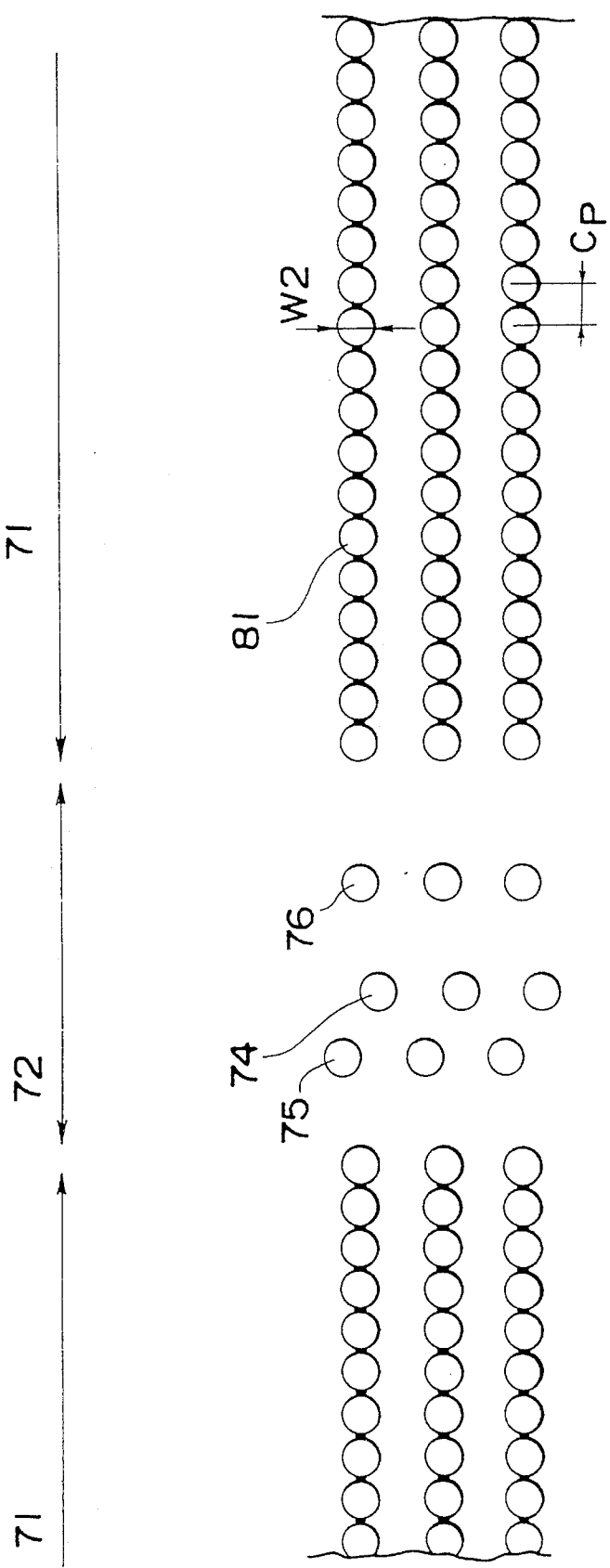
FIGS. 8(a)–8(c) are plane views showing the construction of a pit capsule in accordance with a second embodiment of the present invention.

In order to obtain the adiabatic effect with the edges of the groove width, a method of surrounding the periphery of the recording mark with groove edges is further effective. In the state change medium using the conventional reflection index change, a method of forming capsule shaped pits, instead of a guide track composed of continuous groove, has been proposed as a method of improving the durability of the repeating record (Jpn. J. Appl. Phys. Vol. 31(1992) p. 482). The recording life of the film is reported to be improved, because the application energies of the total during the recording time can be made smaller than that of the conventional system with the application of pulses for a short time upon the center of the capsule shaped pits. In the present embodiment, the recording medium can be obtained by the formation of a film having the optical phase change on the substrate provided with pit pulses composed of a similar arrangement. FIGS. 8(a)–8(c) show the construction of the portion corresponding to the guide groove shown in the embodiment 1 with a pit capsule with circular concave and convex pits being provided in proximity. The pit capsule 81 is formed at a constant interval from the clock pit 76 using the sample servo system in the tracing system. The pitch Cp in the track direction of each pit capsule is provided in proximity two times or lower of the diameter W2 of the capsule. The recording operation is effected on the center of the given pit capsule by the application of the laser pulse of constant time interval from the timing where the optical beam detects the clock pit 76 at the recording time of the signal.

Figure 9:
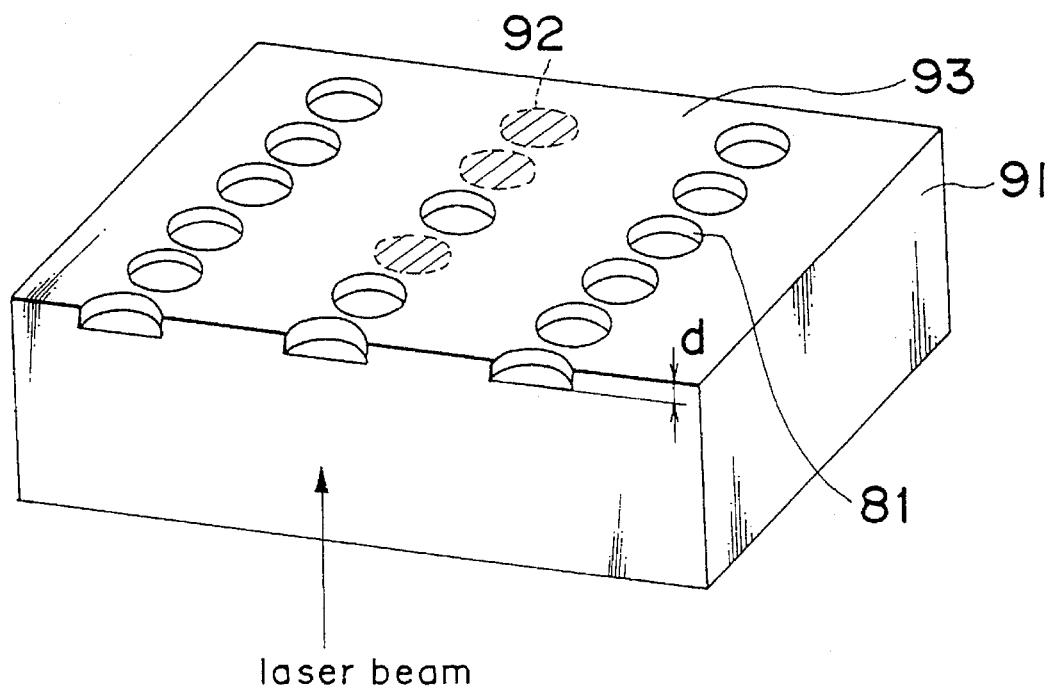
FIG. 9 is a view with the optical phase change recording being effected on the pit capsule in accordance with the second embodiment.

The above described recording film layer is formed on the pit capsule 81. FIG. 9 shows a conceptional view of a recording condition seen from the optical phase in a case of forming the mark on it. The pit capsule 81 of $\lambda/4n$ in depth d is provided on the surface of the substrate 91. By the application of the recording light upon a film in the crystalline state (non-recording condition), the recording film layer forms a recording mark in the amorphous state, with the optical phase difference caused between them being $-\pi$. The recording mark which is in the amorphous state removes the stage difference by pit capsule as shown with imaginary mark 92 with respect to the incident light beam 15 so as to function to become such a height as in the plane portion 93.

The experimental result where the optical phase change film is actually formed on the substrate provided with the pit capsule 81 so as to record the signal is described hereinafter. A pit capsule string arranged with a 0.7 μm diameter capsule, and a pitch of 0.8 μm is provided. A recording operation is effected to alternately form the amorphous marks on each capsule. The optical system of the recording operation effects the recording operation of the alternate pulse application upon the pit capsule with the recording pulse width being 20 ns under the same conditions as the continuous grooves. As a result, it is found that the adiabatic effect of the recording mark effectively works with the edges of the pit capsules with the C/N being approximately a constant value within the range of ±15% or more with 18 mW as a center. When compared with the measurement result of a film having a conventional reflection change, it is found that the absolute value of C/N in the signal amplitude is raised so as to be as large as 6 dB or more although the change of the C/N with respect to the recording power is the same. The pit capsule has an effect of reducing the thermal damage in the case of recording using the conventional reflection index change. The pit capsule functions in the direction of reducing the signal amplitude of the reflection index change in the reverse consideration of the signal detection. When the optical phase change medium is used, the signal amplitude is large. It is possible to largely retain the operation margin of the recording power. The effect of restraining the thermal damage of the film can be reduced as in the reflection index change.

It is possible to considerably enlarge the tolerance width with respect to the power variation at the recording time using the substrate using the pit capsule as described hereinabove. The recording operation high in the signal quality can be effected as compared with the conventional reflection index change recording operation of the same system.

The effect of the guide groove using the pit capsule shown here further promotes the thermal interruption effect of the continuous grooves and can be handled likewise in the case of the recording operation in the continuous groove as the signal obtained during the reproduction time. The subsequent embodiment will be described including two concepts of the continuous grooves and the capsule pit in the expression of the given grooves so as to simplify the description.

EMBODIMENT 3

Although the embodiments 2 and 3 are a method of using a guide groove of a sample servo system, a system of recording wit the use of a guide groove in the continuous servo system will be described hereinafter.

Table 1 shows the stability of the optical quantity change and the servo operation with respect to the groove depth. An astigmatism method or a knife edge method is used for the focus control operation as a servo system. A three-spot method to be used in reproduction exclusive use is used for tracking control operation. The methods are compared with.

TABLE 1

| Groove Depth | | 0 | $\lambda/8n$ | $\lambda/4n$ |
|---|---|---|---|---|
| reflection light quantity change | | large | small | large |
| focus | non-recording condition | o | o | x |
| focus | recording condition | o | o | o |
| tracking | non-recording condition | x | o | o |
| tracking | recording condition | o | o | o |

It is found out in the conventional servo system that the conditions of satisfying at the same time two facts that large signal amplitude and servo signals are obtained from the Table 1. The subsequent embodiment as a method of solving it shows a method of recording and reproducing signals through making it possible to effect the focus control of the recording medium using the guide groove near the depth $\lambda/4n$.

Figure 10A:
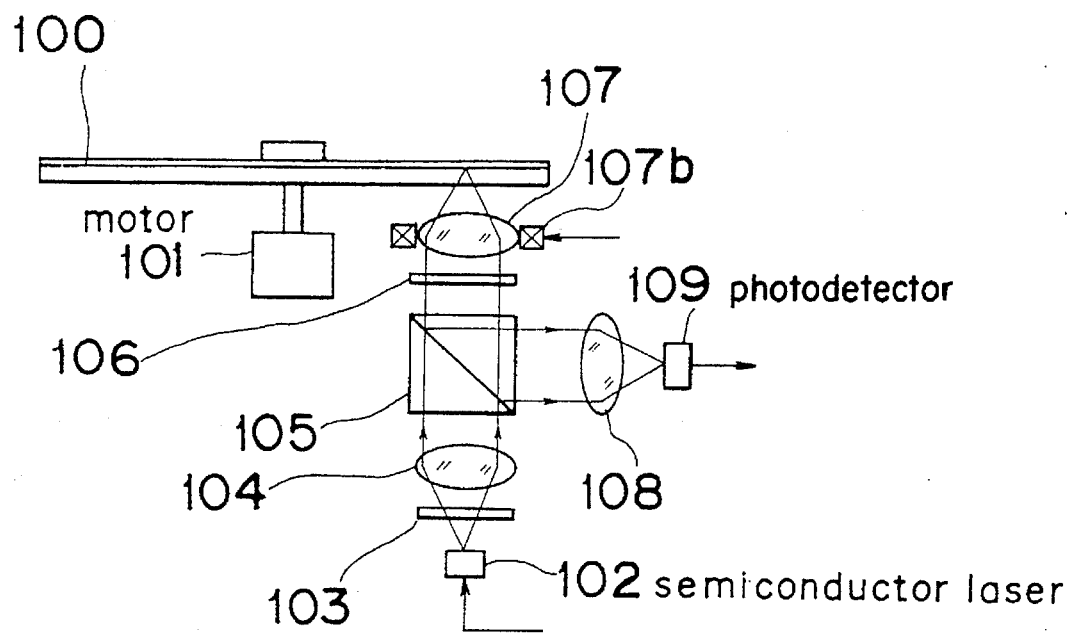
FIGS. 10(a)–10(b) are block diagrams of an optical system of an optical information recording apparatus in accordance with a third embodiment and a view showing the optical modulation waveforms and recording marks at a signal recording time.
Figure 10B:
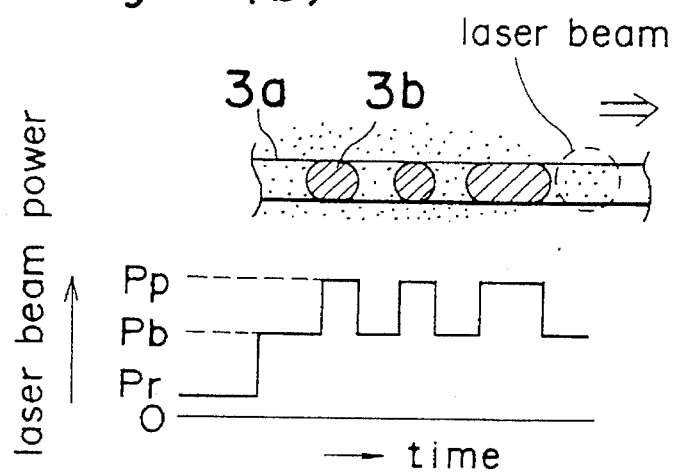

FIGS. 10(a)–10(b) show the optical system of the present optical information recording apparatus and the relationship between the modulation waveform of the light and the recording mark to be obtained. Light is applied with the optical recording medium 100 being rotated by a motor 101. Light from the semiconductor laser 102 become a zero-ith order, ±1st order primary diffraction light beam using the diffraction grid 103 of beam division type, and becomes parallel beams by a collimator lens 104, pass through a PBS 105, λ/4 plate 106, an objective lens 107, and is collected as three optical spots on the recording film face of the recording medium 100. The reflected beams from the recording film are transmitted through the objective lens 107, the λ/4 plate 106 and are reflected by the PBS 105, and are collected on the photodetector 109 having a plurality of light receiving faces by a cylindrical lens 108. The output signal from the photodetector 109 is amplified so as to generate a reproduction signal, a focus error signal or a tracking error signal for effecting a servo operation with a voice coil 107b.

FIG. 11 shows the construction of an optical spot on the optical recording medium. Three spot strings of a first spot 111 corresponding to the zero-ith order light of the diffracted light, second subspots 112 and 113 corresponding to the ±1st order diffraction light are focused onto the guide grooves 110 formed from the concave and convex continuous grooves. Hereinafter the primary spot 111 is called a main spot, and the second and third spots are called subspots. The central axis for connecting each spot is arranged in a position oblique in a direction of the guide groove 110, and the main spot 111 and the subspot 112 and 113 are arranged in positions shifted by approximately ¼ of a track pitch Tp in a direction of the guide groove as an inclination quantity. The focus control and the tracking control operations of the optical beams are effected by the detection of the reflected beam or the transmitted beam from the subspots 112 and 113. Signals are recorded on the recording medium by the main spot 111 so as to further reproduce the information signal recorded by the detection of the reflected light or the transmitted light from the recording medium.

When the main spot 111 is positioned at the center of the guide groove 110 is shown, the reflected beam from the guide groove is hard to become incident onto photodetector due to the diffraction. The subspots 112 and 113 are hard to apply to the positions shifted by a constant interval from the center of the guide groove. A constant optical quantity is incident into the photodetector into the respective subspots 112 and 113.

The state change material used in the optical phase change record of the present embodiment is recorded by the intensity modulation of the single optical beam. FIG. 10(b) shows the recording mark obtained by the intensity change of the laser beam at the recording time. The respective power is assumed to be the intensity change of the main spot 111. The power of the main spot is effected by the application on the recording film on the track 110 on the optical disk of the light modulated between the peak power Pp and the bias power Pb in accordance with the information signal form the power Pr at the reproduction time. Upon the application of such light, in the application portion, a portion 3a receiving the peak power is changed into the amorphous state. A portion 3b receiving the bias power is changed into the crystalline state. The former recording condition, if it is either, becomes the respective condition independently. The overriding operation is effected by the state change medium from the above described characteristics.

The problem is in that the main beam change becomes the power change of the subbeam at the same time as the main beam 111 and the subbeams 112 and 113 are incident from the same semiconductor laser. The optical recording apparatus is required to have a constant tolerance width with respect to the application power variation, considering the variation of the using circumstance and the optical system, further aging change or the like of the optical recording medium. When the recording operation is effected by the imagined maximum peak power, it is necessary to erase the recording signal of the recording track or the adjacent track with the subbeams 112, 113. The optical quantity ratio between the subbeam and the main beam separated by the diffraction grid can set the following conditions in a constant range. In the case of the maximum peak power Pp-max of the main beam for effecting the armophous state during the recording time and for effecting the minimum bias power Pb-min for effecting the crystalline state, a value is assumed for establishing the relationship of $$P\text{-}main/P\text{-}sub > Pp\text{-}max/Pb\text{-}min \quad \text{(equation 2)}$$

between the main beam power P-main and the power P-sub of the single subbeam. The above described construction can prevent the erasing of the recording mark by the above described subbeam.

Figure 12A:
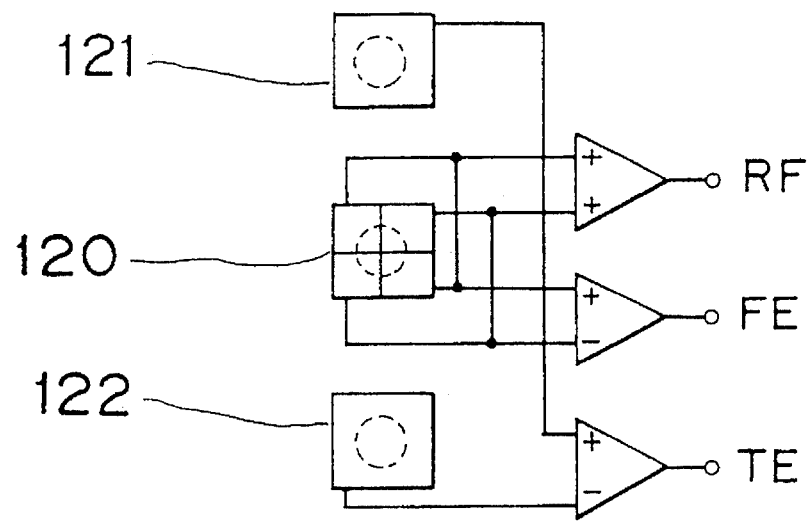
FIGS. 12(a)–12(b) are block diagrams of photodetectors of an optical information recording apparatus in the embodiment.
Figure 12B:
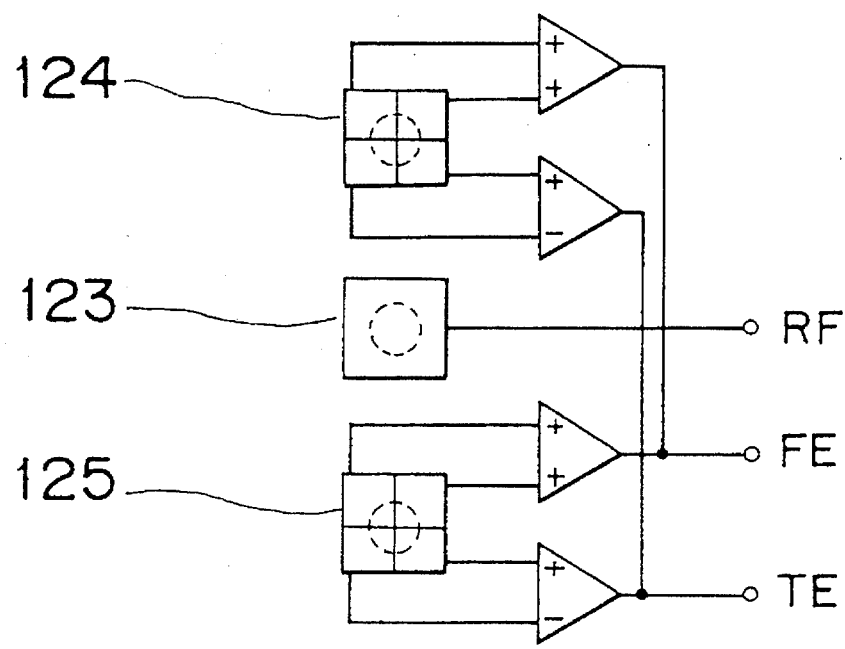

FIGS. 12(a)–12(b) show the construction of a focus photodetector, FIG. 12(a) is for 3-beam servo to be used conventionally, FIG. 12(b) is the construction of the present invention. A servo system shown in FIG. 12(a) receives the reflected light from the main spot 111 in a detector 120, effects a focus control operation with the distribution being made constant, detects the reflected light from the subspots 112 and 113 by photodetectors 121 and 122, and obtains the tracking control signal TE from the intensity difference so as to effect a controlling operation. When the guide groove of $\lambda/4n$ in depth is used as described in the Table 1, when the optical beams are applied on the guide groove in the condition of the non-recording operation, the conditions become non-reflective and the reflected light becomes incident onto the detector no more. The focus servo by the main beam becomes impossible to perform.

In order to solve it, a focus controlling operation is effected so that the distribution of the light on the photodetector may become constant with the output signal by the use of the four-division of detectors 124 and 125 of the reflection light of the subspots 112 and 113 as shown in FIG. 12(b). As the subspot is in a position shifted by approximately ¼ of the track pitch of the guide groove, a constant amount of light is incident on the photodetector even in a condition with the main beam being at the center of the guide groove. As a result, the servo operation can be effected into the guide groove of the $\lambda/4n$ groove.

Although an example for effecting the focus control using two detectors 124 and 125 at the same time, either of the detectors may be used. Although the light receiving face of the photodetectors 123 for main spot use has only one face, the controlling operation of the conventional 3 beam servos jointly used can be effected if the detector is divided into four. When a knife edge method is applied as a focus control method, a screening plate for screening one portion of the reflected beam has only to be provided immediately before the photodetector 109 with the lens 108 shown in FIG. 10(a) being provided as a normal spherical lens.

EMBODIMENT 4

The embodiment 3 shows the focus controlling operation using the subspot in three sots to be applied. It relates to a method capable of effecting a servo operation with the conventional optical detection system shown in FIG. 12 (a).

The focus control is impossible to operate in the nonrecording condition when the guide groove of the $\lambda/4n$ is used as shown in Table 1. The reflection beam from the main spot is incident onto the photodetector in the recording condition. In the present embodiment, the use of it makes it possible to effect a focus control operation with the conventional photodetector with the pseudo-recording operation at the formation of the optical recording medium.

Figure 13:
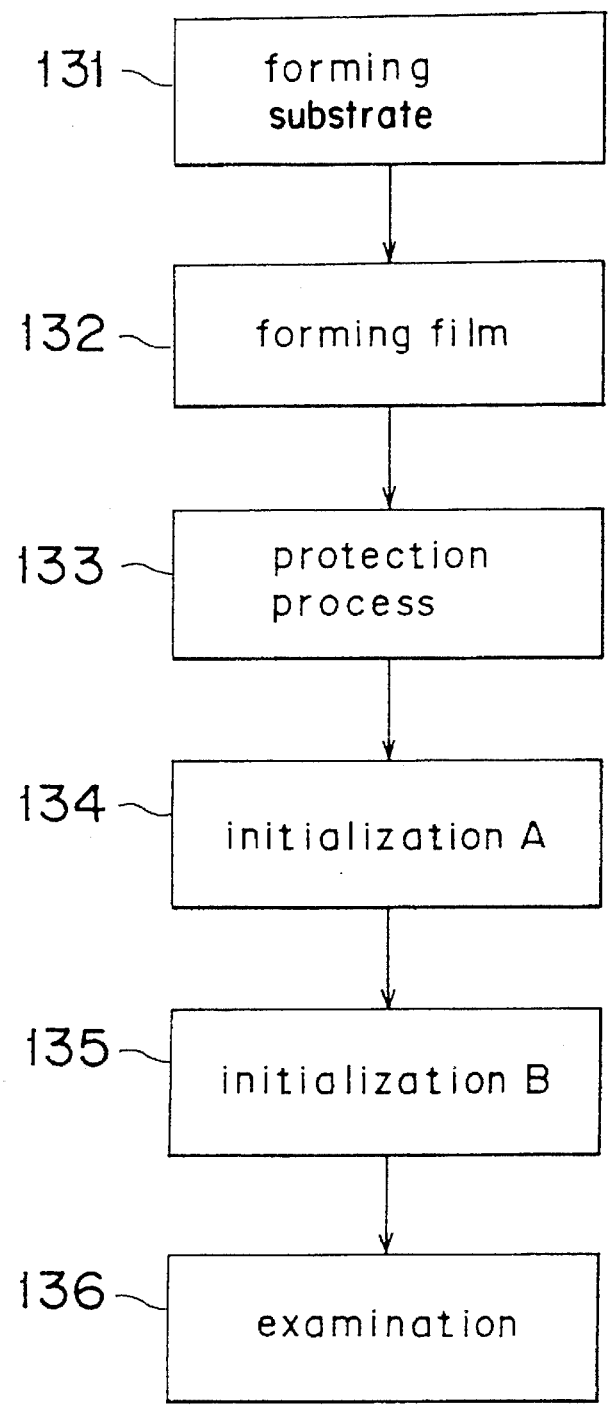
FIG. 13 is a flowchart of an initializing processing steps in accordance with a fourth embodiment of the present invention.

FIG. 13 shows the manufacturing steps of the optical recording medium of the present invention. Included is a substrate forming step 131 for forming a substrate by injection molding or the like having guide grooves on the surface, a film molding step 132 for forming the recording film layer on the substrate by a sputtering method or the like; a protective processing step 133 for forming a protective layer such as resin on the film layer as the step of forming the disk. The recording film at this stage is in an amorphous state as the formed film is. A processing operation for changing from the amorphous state into a crystalline state is effected by an initializing operation of step 134. This condition is a non-recording condition shown in the embodiments 1, 2, 3. In the present invention, an initialization of step 135 of applying a laser beam onto the recording medium of this condition is effected. In the initialization B, a value different from the laser beam for actually effecting a data recording operation is used for the wavelength of the laser beam to be applied. An Ar laser is used for the laser light source. The semiconductor laser portion of an optical system shown, for example, in FIG. 10(a) is replaced and components are composed of optical components adjusted to the wavelength of the Ar laser so as to effect the focus control operation on the optical recording medium. As the depth of the guide groove is adapted to be suitable for the semiconductor laser of 780 nm in the above described wavelength, the groove depth becomes 1.5 times as deep for the wavelength of 524 nm of the Ar laser. The groove of $\lambda/4n$ of 780 nm in depth is equivalent to 3 $\lambda/8n$ in 524 nm. A sufficient amount of light is incident onto the detector even in the main beam so that the focus control operation can be effected. The tracking control operation is effected using the reflected light of the subbeam equivalently as before. A recording mark composed of constant density patterns is formed onto the guide groove of the optical recording medium by the modulation in a given frequency of the Ar laser beams with an AO modulator or an EO modulator in a condition of focus and tracking control effected in accordance with such a step. Once the condition is obtained, the focus controlling operation can be effected with an optical system with a semiconductor laser as shown in FIG. 10(a) being mounted on it and the subsequent data can be recorded. The recording mark formed in the initialization B becomes a form which can be identified from the data signals in the actual using condition. An identification signal showing that the signal is not actual data is provided in a specific region on the recording medium or the patterns are made different from the data patterns so that the non-recording condition can be confirmed.

Although a control system using three spots in the servo is used, 3 $\lambda/8n$ can be obtained with the groove depth being 524 nm and sufficient tracking error signal can be obtained even with a push pull method as described. A focusing or tracking operation using a single laser spot can be effected by the selection of the wavelength of the laser beams to be used in the initialization in accordance with the disk construction.

Although the recording mode has been described about a case where the recording medium forms a crystalline and amorphous marks, a recording using a record mode in an opposition direction if the change is one giving the optical phase difference or using the stated change between the crystalline state and the another crystalline state the crystal can be used. Although the groove shape is shown as being convex on the laser beam side, a concave shape may be reversibly used on the laser beam side. Although the depth of concave and convex grooves is described only about the λ/4n, a value which shows an effect equivalent to that of the present invention will do in accordance with the construction of the servo system of the recording apparatus or the tolerance of the servo.

Although the rewriting operation of the optical phase change medium is not described in detail in the present embodiment, the present invention is changed in the film thickness construction using the conventional amplitude change medium in the present invention, and the same characteristics are obtained about the repeating recording, especially overwrite characteristics.

EMBODIMENT 5

The recording mark obtained by the optical phase change recording medium functions on the reproduction spot as in the disk for reproduction exclusive use provided with concave and convex pits. The same disk plane is divided as in FIG. 14 so as to provide the region for reproduction exclusive use and a region capable of recording, reproducing operations. The information from both can be reproduced using the same optical system and the same signal processing circuit. In a substrate 141, a reproduction exclusive region 143 composed of concave and convex pits on, for example, the inner peripheral side and a recording and reproducing region 144 composed of continuous concave and convex grooves or capsule pit strings are provided on the external peripheral side. An optical disk is composed by the formation of a recording film layer 142 on the substrate 141.

Figure 15A:
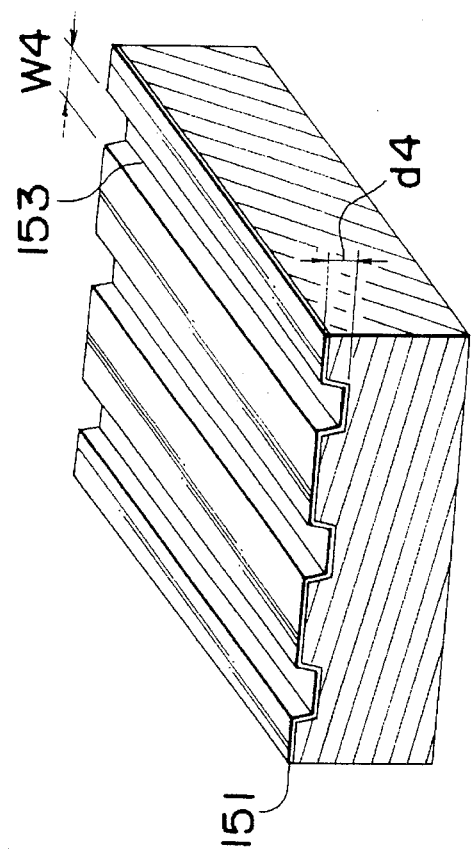
FIGS. 15(a)–15(b) are views of a recording member in accordance with the fifth embodiment of the present invention.
Figure 15B:
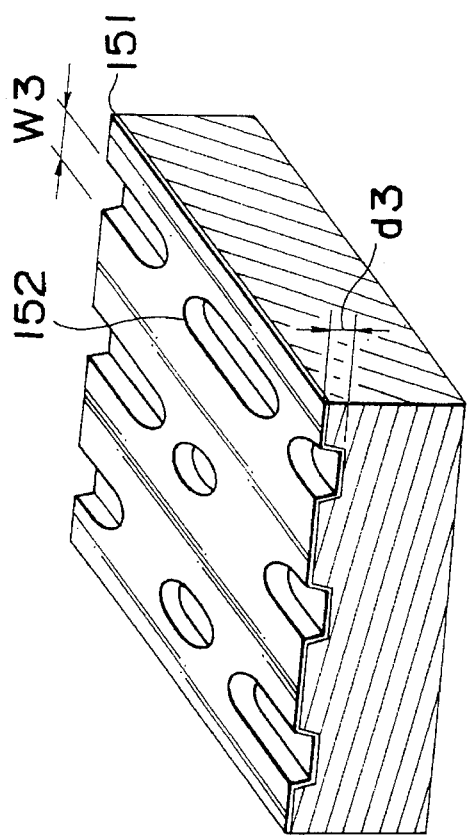

FIG. 15 (a) shows a perspective sectional view of a reproduction exclusive region and FIG. 15(b) shows a perspective sectional view of a recording and reproducing region using continuous grooves. Although the forms of the reproduction exclusive pit string 152 and the recording and reproducing region groove 153 may be either a sample servo system as shown in the embodiment 1 or a continuous groove system as shown in the embodiment 3, it is important to be the same signal format in both the regions. For example, when the recording and reproducing region is a sample format, the reproducing exclusive region is also made a form provided with sample pits for sample format use. By the above construction, it becomes possible to reproduce signals formed in the reproduction exclusive region and the recording and reproducing region without the switching of the servo system.

In order to simplify the signal demodulation, it is desirable for the signal amplitude of the reproduction exclusive region be equal to the signal amplitude from the recording mark of the recording and reproducing region. It is important to fill the following conditions.

1) The recording film 151 showing the optical phase change is formed in the same conditions in both the reproduction exclusive region and the recording and reproducing region. Namely, the reflection index of the non-recording condition is the same as the reflection index of the region for reproduction exclusive use.

2) The depth d3 of the concave and convex pit of the reproduction exclusive region is the same as the depth of the guide groove d4 of the recording and reproduction region or the sample pit.

3) The width W3 of the concave and convex pit of the reproduction exclusive region is the same as the width of the guide groove W4 of the recording and reproducing region or the sample pit.

4) The optical phase change quantity when the recording mark is formed on the recording film is equal to the optical phase difference of the groove depth of the recording and reproducing region or the structural phase difference by the sample pit, and is opposite in polarity.

5) The reflection index between the non-recording condition of the recording film and the condition where the recording mark is formed is the same.

From the above described conditions, the signals from the reproducing exclusive region and the recording and reproducing region can be reproduced using the same optical system and the signal processing system, and an optical disk having a plurality of functions and the reproducing apparatus thereof can be obtained with the simple and low cost system.

EMBODIMENT 6

Figure 16:
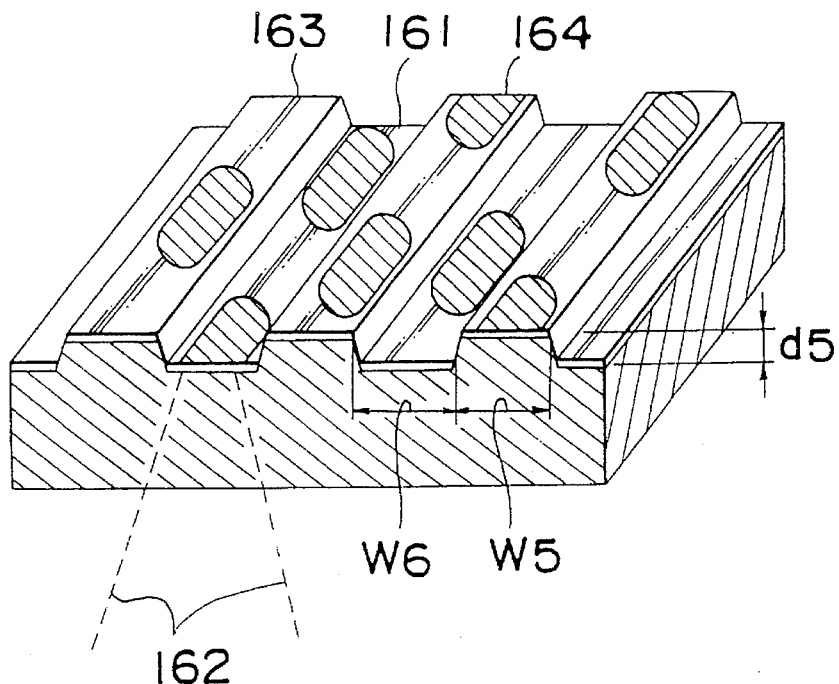
FIG. 16 is a view of an optical information recording member in accordance with a sixth embodiment of the present invention.

The method is one of effecting a recording operation in either of the concave and convex of the guide grooves for thermal interruption use. A method of recording on both the sides of the concave portion and the convex portion of the guide groove as described in FIG. 16 is described below. There is a problem in that the recording marks of the adjacent tracks give influences to the reproduction track when the information is recorded and reproduced on both the guide grooves. When the optical beams 162 are focused on the track 161 so as to reproduce the information of the group, both the signals of the adjacent land tracks 163 and 164 in addition to the track 161 are added to the reproducing signal as crosstalk. The crosstalk amount shows a value different by the depth d5 of the guide groove.

Figure 17:
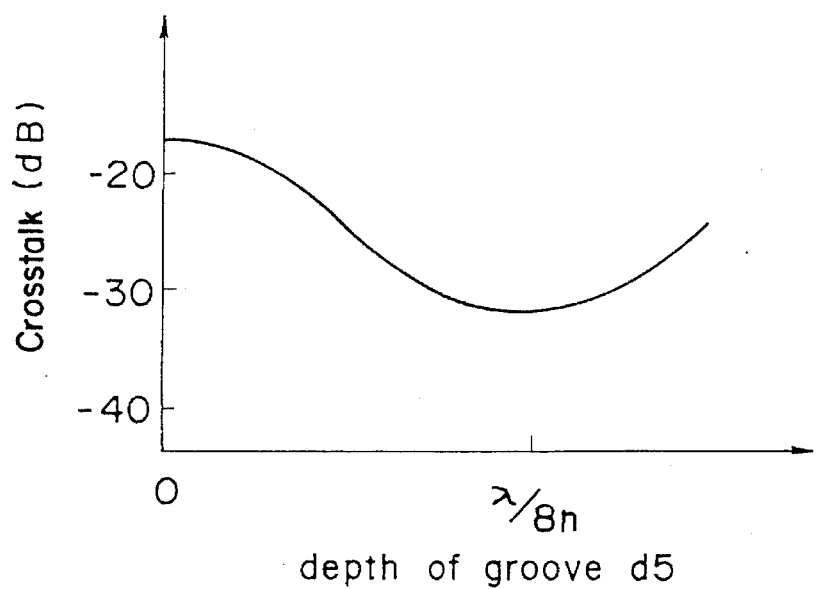
FIG. 17 is a characteristic graph showing a guide groove depth dependence property of a crosstalk quantity from adjacent tracks.

FIG. 17 shows the experiment results when the optical phase change medium is provided on a substrate with the groove depth d5 having a change crosstalk amount. The equivalents to the optical system used in the embodiment 1 and the recording conditions are used as the measurement conditions. The substrate used in the recording operation is 1.6 μm in land pitch. The groove width W5 and W6 of the land portion and the group portion are made the same so that the amplitudes of the signals recorded in both the grooves may become the same. The result is close to the λ/8 in groove depth. There is a tendency of being larger in the recording signal and being smaller in crosstalk quantity. Since the optical phase change amount of the recording film using it is $0.86\pi$, the crosstalk is shown to become the lowest under the conditions of approximately ½ in the optical phase difference to be caused with grooves. The above described results can provide an optical disk high in track density by the formation of the optical phase change recording film on the substrate having a continuous groove.

Figure 18A:
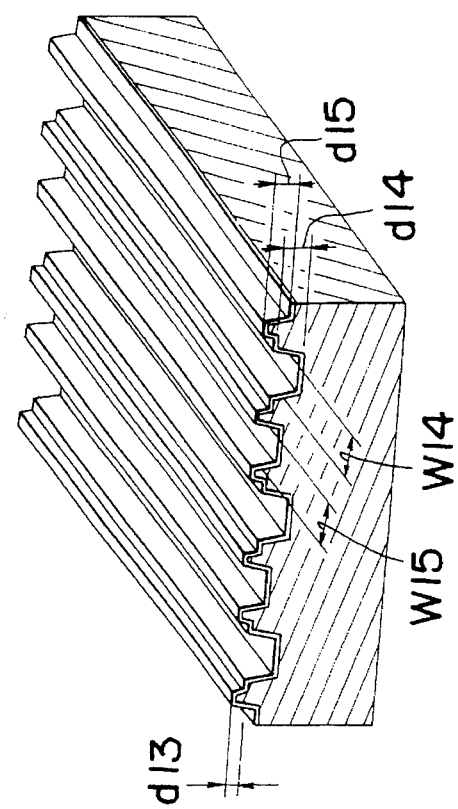
FIGS. 18(a)–18(b) are views of an optical information recording member in accordance with a seventh embodiment of the present invention.
Figure 18B:
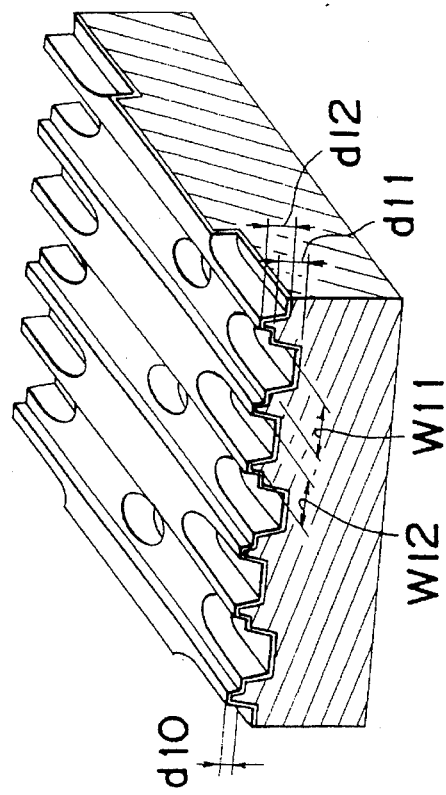

A guide groove shown in FIG. 18 (b) is considered a method of string the width of the mark in the perpendicular direction to the track. A second guide groove of d15 in depth and a third guide groove of d14 in depth are provided in both the concave and convex portions of the first guide grooves of the conventional depth d13. The depth of the second, third guide grooves are set to approximately twice the depth of the groove for forming the land group as described hereinabove. The diffraction effect of the spot in the vertical direction of the track can be retained better when the concave portion interior of the first guide groove or the convex portion interior thereof is considered by the provision of the guide groove of the above described construction.

Although the apparatus for effecting the land group recording operation is not described in detail, the information can be recorded on either of the land and the group or which information is reproduced in addition to the conventional recording and reproducing apparatus can be coped with the provision of the function of reversing the polarity of the tracking in accordance with the track as an object.

EMBODIMENT 7

Figure 14:
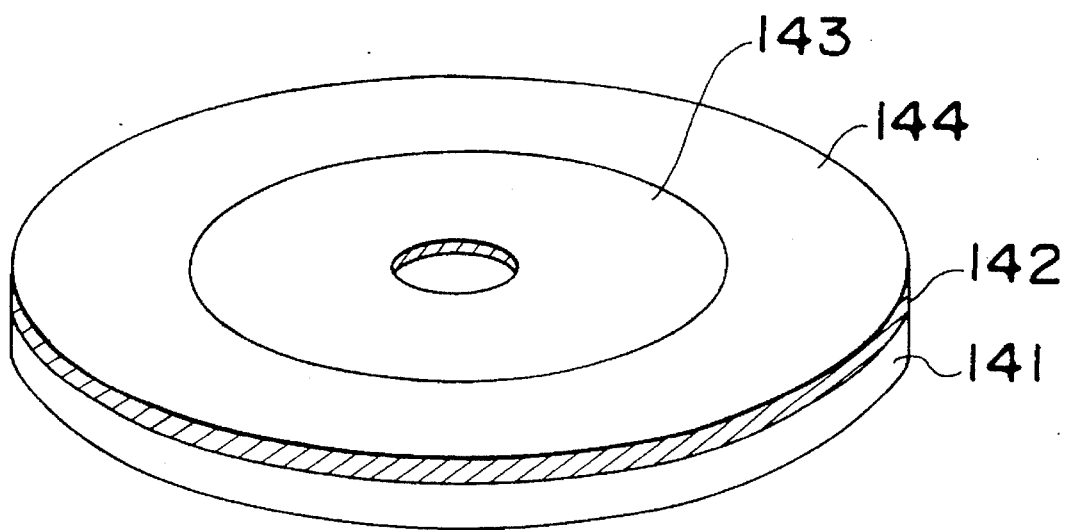
FIG. 14 is a view of a recording member in accordance with a fifth embodiment of the present invention.

A method of recording signals in both the land and the group shown in FIG. 6 can be developed in a method of dividing the same plane and providing the reproducing exclusive region and the reproducing, reproducing region as shown in FIG. 14.

The reproduction exclusive region 143 forms guide grooves equal in groove widths W11 and W12 of the concave portion, the convex portion of the depth d10, considering the crosstalk, of the same conditions in advance as shown in FIG. 18 and the convex and convex pits composed of the depth d11, d12 in both of the convex potion, the concave portion of the guide grooves are formed. The guide grooves used in the embodiment 6 are provided in the recording, reproducing region 144 formed in a position different from that of the same plane as the reproduction exclusive region. The guide groove for thermal interruption use of the same shape as in a case where long concave and convex pits are formed in the track direction of the recording and reproducing region in all the basic construction is provided. The stage difference d13 and d10 of the respective regions can be made equal. It is desirable that the depth of the concave, convex pit and the depths d14, d15, d11, and d12 of the thermal interruption grooves, the width of the concave and convex pits and the width W11, W12, W14, and W15 of the thermal interruption guide grooves be respectively made equal. The medium designing with the conditions (1), (4), and (5) shown in the embodiment 5 being added to it is required. A complex type of optical disk with higher track density, and a reproducing apparatus thereof can be obtained through the comparison with the embodiment 4 by the above described conditions.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical information recording medium comprising a substrate and a recording layer formed thereon;
   said substrate comprising a guide groove with a concave portion, and a convex portion;
   a width of the groove being made smaller than a spot diameter of a light beam focused on the recording layer;
   the recording layer undergoing optically detectable changes by an application of the light beam which is modulated according to an information signal;
   the optically detectable changes of the recording layer caused by the light beam being a state change of the layer from a first state into a second state before an application of the light beam of a first intensity;
   and changed into the first state from the second state before the application of the light beam of a second intensity which is lower than the first intensity;
   the first state and the second state having different complex refractive indices;
   an optical phase of a reflected light beam from the recording layer being different between a region of the first state and a region of the second state;
   a change of the optical phase from the first state to the second state reducing an optical phase difference between the concave portion and the convex portion of the guide groove.

2. The optical information recording medium as defined in claim 1, wherein the width of the groove W is in relationship to:

$$0.13 < W \times NA/\lambda < 0.51$$

where a wave length of the light beam is $\lambda$, and a numerical aperture of a lens for focusing the light beam into the recording layer is NA.

3. The optical information recording medium as defined in claim 1, wherein an amount of the optical phase change of the recording film layer is equal to the optical phase difference between the concave portion and the convex portion of the guide groove, and a direction of the optical phase change of the recording layer is opposite in relation to a direction of the optical phase difference.

4. The optical information recording medium as defined in claim 3, where a depth of the guide groove is equal to or smaller than $\lambda/4n$, where a wavelength of the light beam is $\lambda$, a refractive index of the substrate is n, and a numerical aperture of the lens for focusing the light beam onto the recording layer is NA.

5. The optical information recording medium as defined in claim 3, wherein a recording mark from the second state composed of a pattern identifiable from the data signal is provided on the recording layer.

6. The optical information recording medium as defined in claim 1, wherein the recording medium further comprises:
   a first transparent layer formed between the substrate and the recording layer, the first transparent layer having a different refractive index from that of the substrate;
   a second transparent layer formed on an opposite side of the recording layer from the first transparent layer; and
   a reflection layer formed on said second transparent layer, a film thickness of the first transparent layer, the second transparent layer, the recording layer, and the reflection layer being selected to have the change of the optical phase in response to the change into the second state from the first state of the recording layer.

7. The optical information recording medium as defined in claim 6, wherein the recording layer is composed of a state change medium having reversible changes between an amorphous state and a crystalline state corresponding to the first intensity or the second intensity of the application of the light beam.

8. An optical information recording medium comprising a substrate and a recording layer formed thereon;
   said substrate comprising a guide groove with a concave portion and a convex portion;
   and at least two sample pits shifted on both sides from a central line of the guide groove on a region where the guide groove is interrupted;
   said recording layer undergoing optically detectable changes by an application of a light beam;
   the optically detectable changes of the layer being caused by a change in an optical phase of a reflection light or a transmission light from the recording layer;
   the change in the optical phase is in a direction of reducing an optical phase difference between the concave portion and the convex portion of the guide groove.

9. The optical information recording medium as defined in claim 8, wherein the groove width W of the concave and convex guide grooves is in the relationship of $$0.13 < W \times NA/\lambda < 0.51$$

where a wavelength of the light beam is $\lambda$, and a numerical aperture of a lens for focusing the light beam into the recording layer is NA.

10. The optical information recording medium as defined in claim 8, wherein an amount of the optical phase change of the recording layer is equal to the optical phase difference between the concave portion and the convex portion of the guide groove.

11. The optical information recording medium as defined in claim 8, wherein a depth of the guide groove is equal to or smaller than $\lambda/4n$ where a wavelength of the light beam is $\lambda$ a refractive index of the substrate is n, and a numerical aperture of a lens for focusing the light beam into the recording layer is NA.

12. An optical information recording medium comprising a substrate and a recording layer formed thereon;

said substrate comprising a pit capsule string composed of a circular concave portion or a convex portion provided at a constant interval on a track;

and at least two sample pits provided in a position shifted from a central line of the pit capsule string where the pit capsule string is interrupted;

said recording layer undergoing optically detectable changes by an application of a light beam;

the optically detectable changes of the layer being caused by a change in the optical phase of a reflection light or a transmission light from the recording layer;

and the change in the optical phase is in a direction of reducing an optical phase difference between the concave portion and the convex portion of the pit capsule string.

13. The optical information recording medium as defined in claim 12, wherein an amount of the optical phase change of the recording layer is equal to the optical phase difference to the concave portion or the convex portion of the pit capsule string.

14. The optical information recording medium as defined in claim 13, wherein a depth of the pit capsule is equal to or smaller than $\lambda/4n$, where a wavelength of the light beam is $\lambda$ a refractive index of the substrate is n, and a numerical aperture of a lens for focusing the light beam onto the recording layer is NA.

15. The optical information recording medium as defined in claim 13, wherein the recording medium further comprises:

a first transparent layer formed between the substrate and the recording layer, the first transparent layer having a different refractive index from that of the substrate;

a second transparent layer formed on an opposite side of the recording layer from the first transparent layer; and a reflection layer formed on said second transparent layer, a film thickness of the fist transparent layer, the second transparent layer, the recording layer, and the reflection layer being selected to have the change of the optical phase in response to the changed into the second state from the first state of the recording layer.

16. An information recording and/or reproducing method using an optical information recording medium comprising a substrate and a recording layer formed thereon, said substrate comprising a guide groove with a concave portion and a convex portion;

and at least two sample pits shifted on both sides from a central line of the guide groove on a region where the guide groove is interrupted;

said recording layer undergoing optically detectable changes by an application of a light beam;

the optically detectable changes of the layer being caused by a change in an optical phase of a reflection light or a transmission light from the recording layer;

the change in the optical phase is in a direction of reducing an optical phase different between the concave portion and the convex portion of the guide groove irradiating a light beam onto a guide groove formed on a recording medium or onto a pair of sample pits provided in a region where capsule pits are interupted;

detecting reflected light or transmitted light from the recording medium; and effecting a tracking control by reducing a difference in an amount of light between the reflected light and the transmitted light between a pair of the sample pits.

17. An apparatus for recording and/or reproducing information on and/or from a recording medium, said recording medium comprising:

a recording layer disposed on a substrate, said layer undergoing optically detectable changes by an application of a light beam;

said substrate being provided with a guide groove having concave and convex portions;

a width of said grove being smaller than a spot diameter of the light beam focused on the recording layer;

said recording layer undergoing a change of optically detectable states by application of the light beam modulated in accordance with an information signal;

the change of the optically detectable states of the recording layer with absorption of the light beam being from a first state into a second state upon receipt of the application of the light beams at a first intensity of the light while the optically detectable states of the recording layer being changed into the first state from the second state upon receipt of the application of the light beam at a second intensity lower than the first intensity;

the regions of the first and second states of the recording layer having complex refractive indexes which are different from each other, the difference of the complex refractive indexes causing a change in an optical phase of light reflected from the recording layer having the light beam applied thereto;

the change of the optical phase from the first state to the second state being in a direction towards reducing an optical phase difference between the concave portion and the convex portion of said guide groove;

said light beam being composed of at least three spot strings;

a line passing through the centers of the spots of the three light strings being oblique with respect to the guide groove on the recording layer;

the information signal of said recording layer being reproduced by detecting the reflected light or transmitted light from a first spot positioned at the center of a first spot string;

the first spot being tracked on the guide groove to effect a tracking control by detecting the transmitted light or reflection light from the second and third spots positioned before and after the first spot.

18. The apparatus as defined in claim 17, wherein a focus control of the optical information recording medium is effected with reception of the transmitted light or reflected light from the second and third spots by a photodetector divided into at least two parts.

* * * * *